(12) United States Patent
Chong et al.

(10) Patent No.: US 10,327,117 B2

(45) Date of Patent: Jun. 18, 2019

(54) VIRTUAL MESH NETWORK FOR MEDICAL VOICE COMMAND DEVICES

(71) Applicant: CliniCloud Inc., San Francisco, CA (US)

(72) Inventors: Hon Weng Chong, Toorak (AU); An Lin, Eight Mile Plains (AU)

(73) Assignee: CliniCloud Inc., San Francisco, CA (US)

( * ) Notice: Subject to any disclaimer, the term of this patent is extended or adjusted under 35 U.S.C. 154(b) by 147 days.

(21) Appl. No.: 15/427,593

(22) Filed: Feb. 8, 2017

(65) Prior Publication Data

US 2018/0227719 A1  Aug. 9, 2018

(51) Int. Cl.
| | |
|---|---|
| *G06F 15/16* | (2006.01) |
| *H04W 4/20* | (2018.01) |
| *H04L 29/08* | (2006.01) |
| *H04L 12/46* | (2006.01) |
| *H04W 24/08* | (2009.01) |
| *H04W 84/18* | (2009.01) |

(52) U.S. Cl.
CPC ........... *H04W 4/20* (2013.01); *H04L 12/4641* (2013.01); *H04L 67/10* (2013.01); *H04L 67/12* (2013.01); *H04L 67/306* (2013.01); *H04L 67/327* (2013.01); *H04W 24/08* (2013.01); *H04W 84/18* (2013.01)

(58) Field of Classification Search
CPC ....... H04W 4/20; H04W 24/08; H04W 84/18; H04L 67/306; H04L 12/4641; H04L 67/12; H04L 29/08; H04L 12/46
See application file for complete search history.

(56) References Cited

U.S. PATENT DOCUMENTS

| | | | | |
|---|---|---|---|---|
| 8,983,383 | B1* | 3/2015 | Haskin | H04M 1/6041 455/41.2 |
| 2013/0183944 | A1* | 7/2013 | Mozer | H04L 12/282 455/414.1 |
| 2014/0280762 | A1* | 9/2014 | Rothschild | H04L 67/02 709/219 |
| 2015/0086034 | A1* | 3/2015 | Lombardi | H04L 12/2838 381/81 |
| 2016/0316293 | A1* | 10/2016 | Klimanis | H04L 12/2823 |
| 2017/0133011 | A1* | 5/2017 | Chen | H04L 12/4625 |
| 2018/0047394 | A1* | 2/2018 | Tian | G10L 15/24 |
| 2018/0092189 | A1* | 3/2018 | Reier | H05B 37/0236 |

* cited by examiner

*Primary Examiner* — Cheikh T Ndiaye

(74) *Attorney, Agent, or Firm* — Lowenstein Sandler LLP

(57) ABSTRACT

Embodiments cover a server computing device that generates and manages a virtual mesh network associated with voice command devices that share a local area network (LAN). In one embodiment, a message is generated that is associated with a user account. The message is sent to a virtual mesh network associated with the user account, wherein the virtual mesh network includes a virtual hub and a plurality of virtual nodes, and wherein each virtual node is associated with a corresponding voice command device of a plurality of voice command devices that share a local area network (LAN). The virtual hub propagates the message to at least one virtual node of the plurality of virtual nodes, wherein the at least one virtual node provides the message to the corresponding voice command device.

20 Claims, 11 Drawing Sheets

US 10,327,117 B2

VIRTUAL MESH NETWORK FOR MEDICAL VOICE COMMAND DEVICES

TECHNICAL FIELD

Embodiments of the present invention relate, in general, to voice command devices that interface with medical devices and a virtual network executing on a backend server to manage interactions with the voice command devices that share a local area network (LAN) for a household.

BACKGROUND

There are multiple voice command devices that homeowners can purchase. However, current voice command devices are not designed to facilitate management of medical data. Additionally, conventional voice command devices are not typically designed to support divided coverage of an entire household or other location.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Figure 1A:
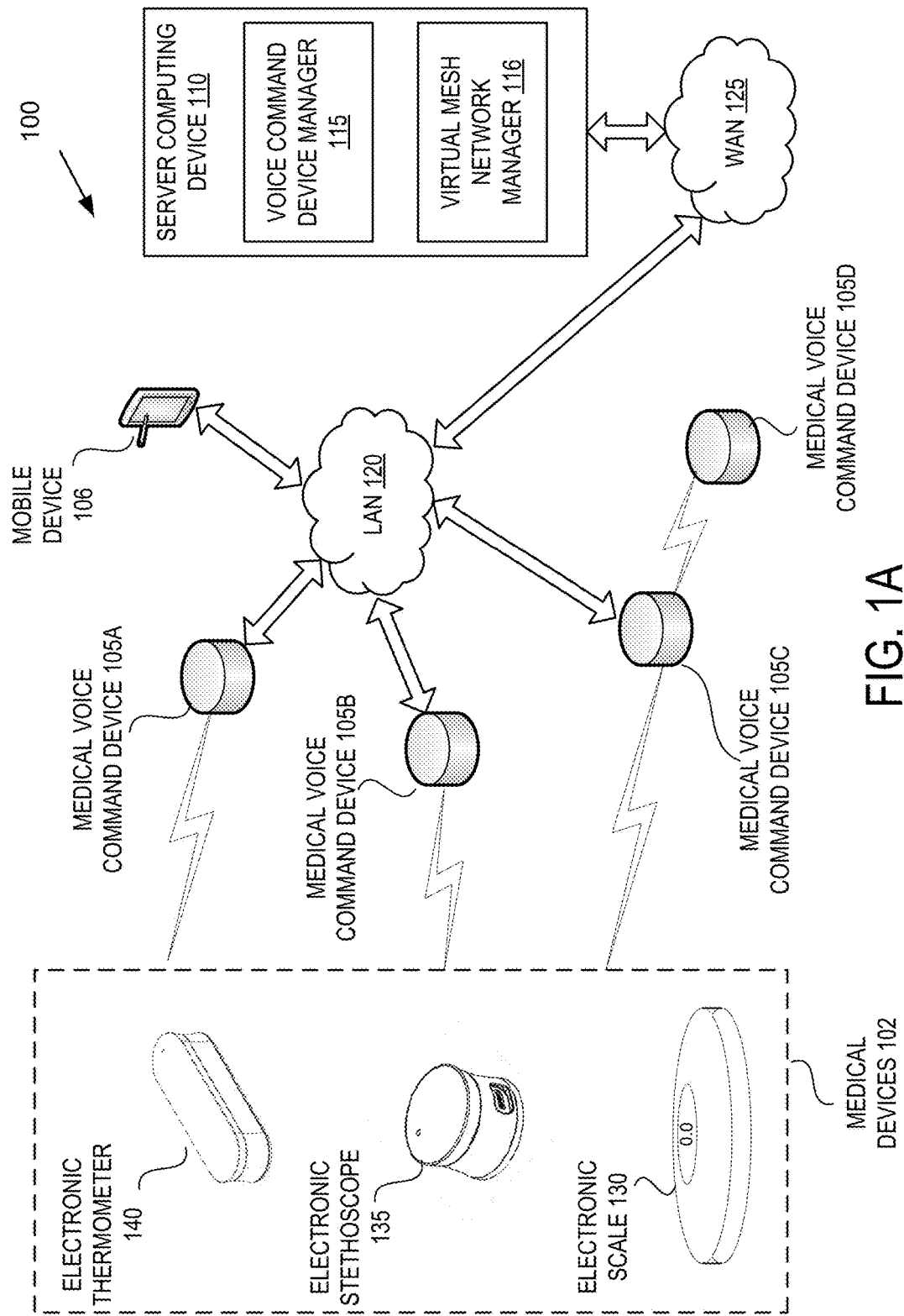
FIG. 1A illustrates an example system architecture for a virtual mesh network to manage interactions with medical voice command devices that share a local area network, in accordance with one embodiment.

Described herein are embodiments of a virtual mesh network manager that interfaces with medical voice command devices that share a local area network (LAN). A medical voice command device acts as a home medical companion or medical hub that can be used to facilitate the creation of medical data (e.g., to help users take measurements regarding their health), to place prescriptions, to schedule appointments, to determine an individual's current and/or historical health, to store the medical data of multiple individuals, and/or to perform countless other tasks that relate to the health of an entire household. A mesh network is a networking topology that provides robust networking coverage to an area using multiple nodes that communicate with each other. Mesh networking nodes typically incorporate advanced networking features and/or hardware in order to facilitate providing mesh networking coverage to an area. Conventional voice command devices are not typically designed to provide mesh networking coverage of a household or other location.

Aspects of the present disclosure remedy the above noted and other deficiencies by providing a virtual mesh network manager that manages interactions with multiple voice command devices that share a local area network (LAN). In one implementation, the virtual mesh network manager associates multiple voice command devices with a user account. Upon determining that the voice command devices share a LAN, the virtual mesh network manager may generate a virtual network associated with the user account. The virtual network may be a virtual mesh network. As defined herein, a virtual mesh network is a virtual network that interposes a virtual node between a server endpoint or hub and an endpoint device (e.g., a medical voice command device or a mobile device). Accordingly, messages from the endpoint device are sent first to that device's associated virtual node, and then from that virtual node to the hub or server endpoint. Similarly, messages from the server endpoint or hub that are directed to an endpoint device are first sent to a virtual node associated with that endpoint device, and then from that virtual node to the endpoint device. The virtual mesh network can include a virtual hub and multiple virtual nodes, where each virtual node is associated with one of the voice command devices that share the same LAN. Alternatively, the functionality of the virtual hub may be included in each of the virtual nodes. A virtual node can receive data from a voice command device and provide messages to the voice command device. The virtual hub may manage the virtual nodes in the virtual mesh network and facilitate data transfer between the server computing device and the voice command devices via the virtual nodes.

The virtual hub for the virtual mesh network may receive voice commands form the voice command devices and/or medical data from medical devices associated with the voice command devices and forward that information to a device manager for processing. The virtual hub may then propagate messages that are generated in response to the voice commands and/or medical data to at least one of the virtual nodes. In some embodiments, the messages may be propagated to a virtual node associated with a voice command device that is closest to the user that issued a voice command. Similarly, the messages may be propagated to a virtual node associated with a voice command device that is closest to a medical device that generated medical data. Notably, if a user issues a voice command and subsequently moves to a different location within a household, the virtual mesh network can determine the voice command device that is nearest the user and send subsequent messages to the nearest voice command device.

The cloud based virtual mesh networking framework of the present disclosure provides advantages over conventional implementations since voice command devices that lack advanced networking capability may be combined to provide coverage to an entire household or other area serviced by a LAN. Additionally, the virtual mesh network can provide a more efficient messaging system by identifying the voice command device closest to a user when providing messages to the user.

Embodiments are described herein with reference to a medical voice command device, a server computing device that interfaces with the medical voice command device, medical data and measurements that include medical data. However, it should be understood that embodiments also apply to non-medical voice command devices that interface with devices that generate measurement data other than medical data. For example, embodiments apply to voice command devices that interface with electronic thermometers used for non-medical purposes, with digital range finders, with electronic hygrometers, with electronic rain meters, and so on. Accordingly, references made herein to medical voice command devices apply equally to other voice command devices, references made to medical data apply equally to non-medical data, and references to medical devices apply to non-medical devices with wireless connectivity.

FIG. 1 illustrates an example system architecture 100 for a virtual mesh network manager 116 to manage medical voice command devices 105A-C that share a local area network (LAN) 120, in accordance with one embodiment. The medical voice command devices 105A-C are devices that interface with users via voice commands to facilitate the acquisition, storage and recall of medical data. The medical voice command devices 105A-C primarily or exclusively interface with users by receiving voice commands and voice responses from the users and outputting voice responses and inquiries to the users. In some implementations, the medical voice command devices 105A-C also interface with users by sending messages to mobile devices, computing devices, social network accounts, email addresses, etc. of the user.

The medical voice command devices 105A-C may be placed in a household or other location, and wirelessly interface with one or more medical devices 102 in the household or other location. Each of the medical devices 102 that interfaces with the medical voice command devices 105A-C is preferably within a wireless communication range of the medical voice command devices 105A-C. Examples of medical devices 102 include an electronic thermometer 140, an electronic stethoscope 135 and an electronic scale 130. Other types of medical devices 102 that may interface with the medical voice command devices 105A-C include an electronic blood pressure monitor, an electronic glucose level monitor, an electronic oximeter, an electrocardiograph machine, an electronic blood alcohol level sensor, a pacemaker, an activity tracker (e.g., such as a FitBit®, Jawbone UP®, Garmin Vivofit®, Nike Fuelband®, Microsoft Band®, etc.), a medical alert watch, a heartrate monitor, and so on. Medical voice command devices 105A-C may interface with any medical devices 102 that have wireless communication capabilities.

Medical voice command devices 105A-C may support one or multiple different wireless communication standards. In one implementation, medical voice command devices 105A-C support Wi-Fi® and Bluetooth®. Medical voice command devices 105A-C may additionally or alternatively support other wireless communication protocols such as Zigbee, Z-Wave, 6LoWPAN, Bluetooth Low Energy (BLE), Thread, near field communication (NFC), radio frequency identifier (RFID), and/or other wireless communication protocols.

Medical voice command devices 105A-C may include an active mode in which the medical voice command device 105 initiates measurements for one or more medical devices 102. The active mode may be performed after a user issues a verbal instruction called a voice activation command that causes one or more of the medical voice command devices 105A-C to transfer out of a low power state. The voice activation command may be a specific phrase that a user speaks to activate the medical voice command device, such as "Hey CC."

Medical voice command devices 105A-C may receive a voice activation command, and may transfer out of the low power state. Medical voice command devices 105A-C may then receive a voice command to take a measurement, such as a command to "take Johnny's temperature" or to "measure my weight." Responsive to receiving a voice command to take a measurement (or otherwise to generate medical data), medical voice command devices 105A-C may determine an intent of the command (e.g. a type of measurement to generate), and then determine an appropriate medical device 102 that is capable of generating the requested measurement. Once the medical device is determined, medical voice command devices 105A-C may send a command to that medical device 102.

In an example, responsive to a request to "take Johnny's temperature," one or more of medical voice command devices 105A-C may determine that electronic thermometer 140 is in range of the medical voice command devices 105A-C, is activated, and is capable of generating a temperature measurement. Medical voice command devices 105A-C may then send a command to electronic thermometer 140 that causes electronic thermometer 140 to generate a temperature measurement. Medical voice command devices 105A-C may additionally output voice instructions for a user to place the electronic thermometer 140 near Johnny's temple (or to otherwise prepare the electronic thermometer 140 for generation of the temperature measurement). The electronic thermometer 140 may then generate the temperature measurement and send the temperature measurement to medical voice command devices 105A-C.

Medical voice command devices 105A-C may additionally include a passive mode in which the medical voice command devices 105A-C continually or periodically scans for unsolicited wireless messages (e.g., packets) from medical devices 102. The passive mode may be a low power mode in which most of the components of the medical voice command devices 105A-C are unpowered or are in a low power consumption state. The wireless packets may be, for example, wireless advertising packets from medical devices 102 (e.g., Bluetooth, Wi-Fi or BLE advertising packets).

A user may interface directly with a medical device 102 to produce a measurement (e.g., to produce medical data). The medical device 102 may then generate an unsolicited wireless message (e.g., a wireless advertising packet) that includes the measurement, and may broadcast the unsolicited wireless message using a wireless communication protocol. The medical voice command devices 105A-C may detect and receive the unsolicited wireless message (which may include a measurement) as a result of scanning for unsolicited messages.

In an example, a member of a household may step onto electronic scale 130. Electronic scale 130 may generate a weight measurement, and may then generate a wireless advertising packet and insert the weight measurement into the wireless advertising packet. Electronic scale 130 may broadcast the wireless advertising packet, which may be detected and received by medical voice command devices 105A-C.

Some medical devices 102 require pairing. For such a medical device 102, one of medical voice command devices 105A-C may initially pair with the medical device 102 with user input. For example, a user may initiate Bluetooth pairing by pressing a button on a medical device 102A and issuing a voice command to medical voice command device 105A to "pair with the medical device 102." The voice command may specify the medical device 102 to pair with generically (e.g., by simply asking to initiate pairing without specifying which device is to be paired with). Alternatively, the voice command may specify the medical device with specificity (e.g., by identifying one or more of the type of medical device, the brand of medical device, the model of medical device, and so on). Pairing may be performed using the standard pairing mechanism for the wireless communication protocol that is used to connect to the medical device 102 that is being paired to the medical voice command device 105A.

Once one of the medical voice command devices 105A-C is paired with a medical device 102, that medical voice command device 105 may scan for unsolicited wireless messages from the medical device 102, where the unsolicited wireless messages may include a request to connect to the medical device 102. Additionally, or alternatively, the medical voice command device 105 may issue connection requests to the medical device 102 that is paired with the medical voice command device 105. Once a connection is established between the medical voice command device 105 and the medical device 102, the medical device 102 may send measurement data (e.g., medical data) to the voice command device and/or the voice command device 105 may send commands to generate measurement data to the medical device 102.

As shown in FIG. 1, in some implementations, multiple medical voice command devices 105A-C may share a local area network (LAN) 120 at the household or other location. The medical voice command devices 105A-C may be connected to the LAN via a wired connection (e.g., an Ethernet connection) or a wireless connection (e.g., a Wi-Fi connection). Some of the medical voice command devices (e.g., medical voice command device 105D) may also be connected to another medical voice command device (e.g., medical voice command device 105C) via a wired or wireless connection, and through that other medical voice command device to the LAN 120. Accordingly, a physical mesh network may be set up for the medical voice command devices 105A-C. For the physical mesh network, messages from medical voice command device 105D to server computing device 110 may be sent first to medical voice command device 105C, and then on to server computing device 110. Similarly, messages from server computing device 110 to medical voice command device 105D may be sent first to medical voice command device 105C and from medical voice command device 105C to medical voice command device 105D.

The LAN 120 may be connected to a wide area network (WAN) 125 such as the Internet or an intranet. For example, a household may include a medical voice command device 105A in a child's bedroom, a medical voice command device 105B in a parent's bedroom, and a medical voice command device 105C in a living room area. In other implementations, more or fewer medical voice command devices may share LAN 120. Additionally, medical voice command devices 105A-C may be positioned in other areas of a household or other location that provide access to LAN 120.

In implementations, medical voice command devices 105A-C may interface with a server computing device 110 that is usually not located in the household or other location of the medical voice command devices 105A-C. The server computing device 110 may be a physical server computing device or a virtual server that runs on underlying physical hardware. For example, the server computing device 110 may run in a cloud environment such as Amazon's® Elastic Compute Cloud (EC2®). In some implementations, the server computing device 110 may likewise be connected to the WAN 125.

The server computing device 110 may include a virtual mesh network manager 116 to facilitate efficient management of the medical voice command devices 105A-C that are located within the household or other location that share LAN 120. In some implementations, virtual mesh network manager 116 may be initiated when a user registers the medical voice command devices 105A-C that are to be located in the home or other location. The user may register medical voice command devices 105A-C using a registration application executing on server 110 (not pictured) that can collect unique identification information associated with each of medical voice command devices 105A-C and store it in a data store connected to server computing device 110. For example, the user may invoke a web application running on server computing device 110 using a browser. In implementations, the user may establish a user account with which the user's medical voice command devices 105A-C and medical devices 102 may be associated.

Once the user has generated an account and added medical voice command devices 105A-C that share the user's LAN 120 to the user account, virtual mesh network manager 116 may generate a virtual network (e.g., a virtual mesh network) associated with the user account. In implementations, the virtual network may include a virtual hub component (not pictured) and a group of virtual nodes (not pictured), where each virtual node is associated with a corresponding medical voice command device 105 that share LAN 120. In other embodiments, the virtual hub may be omitted, and each virtual node may include the functionality of the virtual hub. For example, as shown in FIG. 1A, virtual mesh network manager 116 may generate a single virtual hub, a virtual node A that corresponds to medical voice command devices 105A, a virtual node B that corresponds to medical voice command devices 105B, and a virtual node C that corresponds to medical voice command devices 105C.

The virtual hub may be a software component executing on server 110 that manages receiving commands, data, and/or transmission signals from medical voice command devices 105 via the corresponding virtual node. Additionally, the virtual hub may manage propagating messages to medical voice command devices 105 via their corresponding virtual nodes. Each virtual node may be a software component executing on server 110 that communicates with its corresponding medical voice command device 105. The virtual node may receive commands, data, and/or other transmission signals from the corresponding medical voice command device 105 and forward that information to the virtual hub for processing. Additionally, any messages to be sent to a medical voice command device 105 may first be sent to the corresponding virtual node which may manage the transmission of the message to the appropriate medical voice command device 105.

In embodiments, messages may be generated such as voice outputs and/or text outputs associated with medical data received from medical devices 102. The messages may be generated by the virtual mesh network manager 116, or alternatively, by voice command device manager 115. As described in further detail below, these messages may be based on medical data received from medical devices 102 that are connected to one of medical voice command devices 105A-C. The virtual hub may receive the generated message, and subsequently propagate the message to at least one of the virtual nodes in the virtual mesh network. In implementations, the virtual hub may propagate the message by adding a message to a data structure associated with a virtual node (e.g., adding the message to a queue that is monitored by the virtual node), transmitting the message directly to the executing virtual node component using an application programming interface (API), or in any other manner. The virtual node may then provide the message to the corresponding medical voice command device 105.

The virtual hub may propagate the message to all virtual nodes in the virtual mesh network. Alternatively, the virtual hub may propagate the message to one of the virtual nodes. In one embodiment, the virtual hub may determine that the message is associated with a command received from a particular medical voice command device 105, and propagate the message to the virtual node associated with that medical voice command device. In another embodiment, the virtual hub may determine that the message associated with medical data received from a particular medical device 102, and propagate the message to the virtual node associated with the medical voice command device 105 that is paired with the medical device 102. In another embodiment, the virtual hub may actively monitor the voice commands and/or medical device signals received by each of the virtual nodes in the virtual mesh network, and propagate the message to the virtual node based on the signal strengths detected by each of the virtual nodes. The virtual mesh network manager 116 is described in further detail below with respect to FIG. 2.

In some implementations, the user may also register a mobile device 106 (e.g., mobile phone, tablet computer, laptop computer, personal data assistant (PDA) device, etc.) with the user account that is associated with the user's medical voice command devices 105A-C and medical devices 102. In embodiments, mobile device 106 may execute a mobile application (e.g., a mobile "app") that interacts with the virtual mesh network via the LAN 120 connection. Upon detecting that the mobile device has connected to the LAN 120, the virtual mesh network manager 116 may generate a virtual node associated with the mobile device 106 so the virtual hub for the virtual mesh network may manage interactions with the mobile device 106 via the virtual node. Upon detecting that the mobile device has disconnected from LAN 120 (e.g., if the user leaves the household or other location while the app is executing), the virtual hub manage interactions with mobile device 106 outside of the virtual mesh network (e.g., via text message, via data transfer using a cellular provider's data network, etc.). In one embodiment, when mobile device 106 disconnects from the LAN 120, the virtual hub may terminate the virtual node associated with the mobile device 106. Alternatively, the virtual hub may suspend execution of the virtual node associated with the mobile device 106 and resume execution when the mobile device 106 reconnects to LAN 120.

Server computing device 110 may additionally include a voice command device manager 115 that interfaces with virtual mesh network manager 116 to support the functionality of medical voice command devices 105A-C. In some implementations, voice command device manager 115 may be a component of virtual mesh network manager 116. Alternatively, voice command device manager 115 may be a server component that executes independently from virtual mesh network manager 116, and that communicates directly with virtual mesh network manager 116. When medical voice command device 105 receives medical data (e.g., measurements), it may send that medical data to the voice command device manager 115. The voice command device manager 115 may then determine an identity of a living entity (e.g., a household member) for whom the medical data was generated, and may store the medical data for that living entity in a medical data store in association with a user account of that living entity. Additionally, when medical voice command device 105 receives voice commands, the medical voice command device 105 may send those voice commands (or an intent and parameters determined from the voice commands) to voice command device manager 115. The voice command device manager 115 may perform voice recognition to parse the voice command if a voice command is received. The voice command device manager 115 may send instructions back to the medical voice command device 105 based on the parsed voice command and/or based on the received intent and parameters of the voice command.

Voice command device manager 115 may additionally generate messages such as voice outputs and/or text outputs that notify a user of the received medical data (e.g., a received temperature, heartrate, etc.) and/or of additional information associated with that medical data. For example, if a temperature is above a threshold (e.g., above 100 degrees Fahrenheit), then the voice output or text output may state that the entity whose temperature was taken has a fever and may recommend over the counter medication. If the temperature is above a higher threshold (e.g., above 104 degrees Fahrenheit), then the voice output or text output may recommend immediate medical attention by a doctor and/or may offer to call 911 on behalf of the entity. If a text output is generated, then the medical voice command device 105 may process the text output to convert the text output into a voice output. The voice command device manager 115 additionally performs numerous other functions, which are discussed in greater detail below.

Figure 1B:
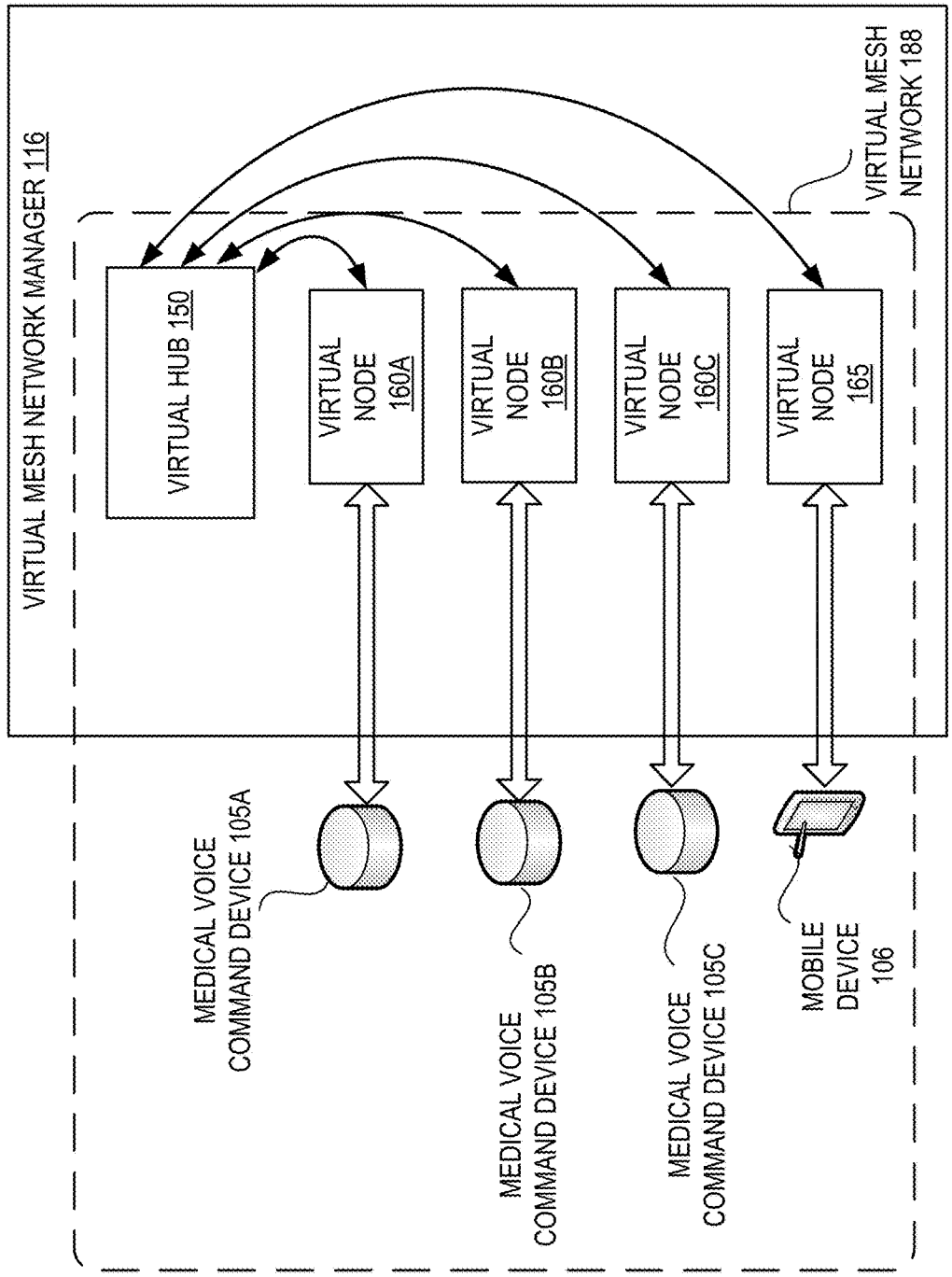
FIG. 1B illustrates a block diagram of a virtual mesh network associated with medical voice command devices that share a local area network, in accordance with one embodiment.

FIG. 1B illustrates a block diagram of a virtual mesh network 188 associated with medical voice command devices 105A-C and mobile device 106 that share a local area network, in accordance with one embodiment. In various embodiments, the medical voice command devices 105A-C, mobile device 106, and virtual mesh network manager 116 illustrated in FIG. 1B may correspond to those described above with respect to FIG. 1A.

As described above in FIG. 1A, when a user has generated an account and added medical voice command devices 105A-C, and mobile device 106 that all share the user's LAN 120 to the user account, virtual mesh network manager 116 may generate a virtual mesh network 188 associated with the user account. In implementations, the virtual mesh network 188 may include medical voice command devices 105A-C, a mobile device 106, a virtual hub 150, virtual nodes 160A-C, and virtual node 165, where each virtual node is associated with a corresponding medical voice command device 105 or mobile device 106 that share LAN 120. For example, as shown in FIG. 1B, virtual mesh network manager 116 may generate a single virtual hub 150, a virtual node 160A that corresponds to medical voice command devices 105A, a virtual node 160B that corresponds to medical voice command devices 105B, a virtual node 160C that corresponds to medical voice command devices 105C, and a virtual node 165 that corresponds to mobile device 106. If the mobile device 106 is removed from the LAN, then the virtual node 165 may be removed and the mobile device 106 and virtual node 165 may no longer be part of the virtual mesh network 188.

Virtual hub 150 may manage propagating messages to medical voice command devices 105A-C via their corresponding virtual nodes 160A-C. Each virtual node 160A-C may communicate with its corresponding medical voice command device 105. Similarly, virtual node 165 may communicate with mobile device 106. For example, virtual node 160A may receive commands, data, and/or other transmission signals from the corresponding medical voice command device 105A and forward that information to the virtual hub 150 for processing. Additionally, any messages to be sent to a medical voice command device 105A may first be sent by virtual hub 150 to virtual node 160A, which may manage the transmission of the message to medical voice command device 105A. Similarly, virtual node 160B may communicate directly with medical voice command device 105B, virtual node 160C may communicate directly with medical voice command device 105C, and virtual node 165 may communicate directly with mobile device 106 when the mobile device 106 is connected to the LAN 120.

As described in further detail below, messages may be generated based on medical data received from medical devices 102 that are connected to one of medical voice command devices 105A-C. Virtual hub 150 may receive the generated message, and subsequently propagate the message to at least one of the virtual nodes 160A-C, 165 in the virtual mesh network 188. The virtual node 160A-C, 165 may then provide the message to the corresponding medical voice command device 105A-C or mobile device 106.

Figure 2:
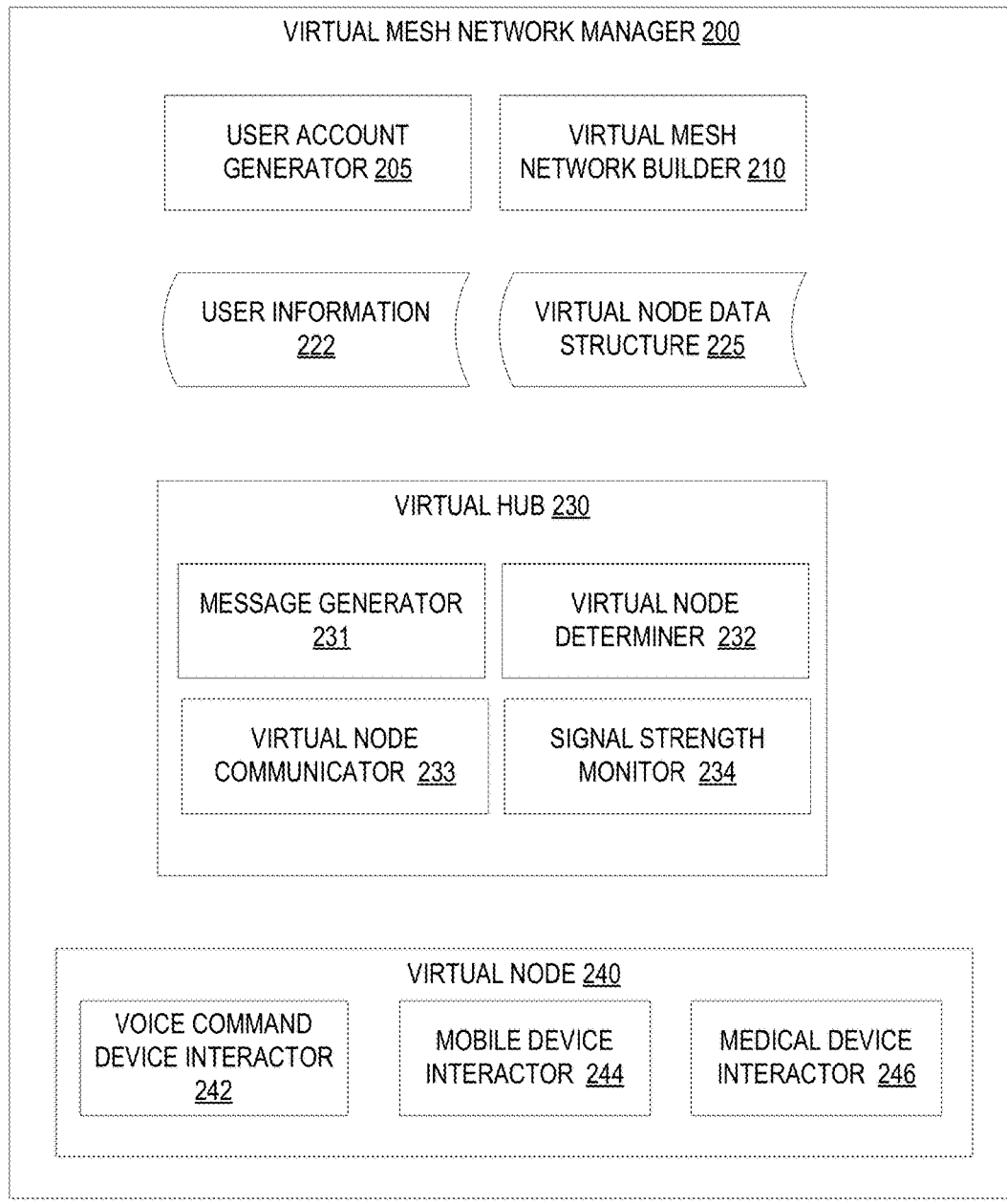
FIG. 2 is a block diagram of a virtual mesh network manager that runs on a server computing device, in accordance with one embodiment.

FIG. 2 is a block diagram of a virtual mesh network manager 200 that runs on a server computing device, in accordance with one embodiment. Virtual mesh network manager 200 may execute, for example, on server computing device 110 of FIG. 1A. In one embodiment, the virtual mesh network manager 200 includes a user account generator 205, a virtual mesh network builder 210, a virtual hub 230, and virtual node 240. While for simplicity only a single virtual node 240 is depicted, in various implementations more than one virtual node 240 may be present. The functionality of any one or more of these components may be combined into a single module or may be divided into multiple modules.

User account generator 205 is responsible for generating a user account for a user of medical voice command devices, and registering one or more medical voice command devices with the user account. User account generator may present a user interface to the user to receive information to identify the user (e.g., user sign on credentials, the user's name and address information, etc.), the user's local area network (LAN) information, unique identifiers for the medical voice command devices that share the user's LAN, etc. Alternatively, user account generator 205 may receive this information via alternative means (e.g., via a data feed provided by an administrator, via a data transmission when the medical voice command devices are first powered on, or the like. Once the identifying information is received, user account generator may generate a user account and store the information in user information 222, which may be a data structure accessible by the virtual mesh network manager 200.

Virtual mesh network builder 210 may then be invoked to generate a virtual mesh network for the user account. As noted above, a virtual mesh network includes a virtual node associated with each medical voice command device that share the user's LAN (e.g., virtual node 240), and a virtual hub that manages data received from and sent to each of the virtual nodes (e.g., virtual hub 230). Virtual mesh network builder 210 may build the virtual mesh network by initiating software components that execute on a server device (e.g., server 110 of FIG. 1A). Virtual mesh network builder 210 may use information received from the user when generating the user account to associate the virtual mesh network with that user account. For example, a unique identifier generated when the user account is created may be used to identify the virtual hub of the virtual mesh network. Additionally, the serial number (or other identification information) for each of the medical voice command devices may be used to identify the corresponding virtual hub for that device. The identifying information for the virtual hub and virtual nodes associated with the virtual hub may be stored in virtual node data structure 225.

Virtual hub 230 may be responsible for managing data received from medical voice command devices via an associated virtual node 240, as well as propagating messages to virtual node 240 that may be generated based on the received data. In some implementations, virtual hub 230 may include message generator 231, virtual node determiner 232, virtual node communicator 233, strength monitor 234, mobile device interactor 235, medical device detector 236, and voice command detector 237. The functionality of any one or more of these components may be combined into a single module or may be divided into multiple modules.

Message generator 231 is responsible for generating a message associated with a user account based on data received from one or more medical voice command device via the corresponding virtual node 240. In one embodiment, message generator 231 corresponds to a voice command device manager that processes medical data received and generates messages to send one of the medical voice command devices associated with the user's account (e.g., voice command device manager 115 of FIG. 1A, voice command device manager 300 of FIG. 3, etc.). In another embodiment, message generator 231 may receive the message from a separate module that includes the voice command device manager. Once the message has been generated or received, virtual hub 230 may then propagate the message to a virtual node 240 in the virtual mesh network. The virtual node 240 may then provide the message to the corresponding medical voice command device associated with the virtual node 240. Examples of medical data and generated messages are described in further detail below with respect to FIG. 3.

Virtual hub 230 may invoke virtual node determiner 232 to determine the appropriate virtual node 240 in the virtual mesh network to which to propagate the message. In one embodiment, virtual hub 230 may propagate the message to all virtual nodes in the virtual mesh network. Virtual node determiner 232 may identify each virtual node 240 in the virtual mesh network for the user account by accessing the information in the virtual node data structure 225. Virtual node communicator 233 may then be invoked to propagate the message to each identified virtual node. Each virtual node 240 may receive the message and invoke voice command device interactor 242 to send the message to the corresponding medical voice command device for that virtual node. In an illustrative example, the message may be an audio alert, and the virtual nodes of the virtual mesh network may provide the message so that the corresponding medical voice command devices output the message vie respective audio outputs of the medical voice command devices in parallel. In other words, each of the medical voice command devices may broadcast the message at the same time via their respective audio outputs.

In some implementations, virtual hub 230 may propagate the message to a particular virtual node. In one embodiment, virtual node determiner 232 may determine that the message is associated with a command received from a particular medical voice command device, where that medical voice command device is associated with a particular virtual node 240. Virtual node determiner 232 may assign the message to a particular virtual node 240 based on the observed signal strength for the command received from each medical voice command device in the system. For example, if a user has two medical voice command devices and speaks a voice command that is detected by both devices, virtual node determiner 232 may send any message generated as a result of the command to the medical voice command device that provided the command with the highest observed signal strength when the command was received. In other words, the message may be provided to the medical voice command device that was closest to the user initiating the voice command (e.g., where the volume of the received command was the highest).

Each virtual node 240 may receive the command from the corresponding medical voice command device. Virtual node communicator 233 may receive the commands from each virtual node and invoke signal strength monitor 234 to identify the command with the greatest signal strength. Using the above example with two medical voice command devices, signal strength monitor 234 may determine one signal strength for the command received from one medical voice command device and a second signal strength for the command received from the second medical voice command device. As noted above, where the command is a voice command, the signal strength of the command received by the first medical voice command device may have one volume and the signal strength for the command received by the second medical voice command device may have a second volume. Signal strength monitor 234 may compare the signal strengths to determine the virtual node to pair with the command.

Thus, if the volume of the command received by the first medical voice command device is greater than that of the command received by the second medical voice command device, virtual node determiner 232 may pair the command with the virtual node associated with the first medical voice command device. Any messages generated by message generator 231 as a result of the voice command may then be propagated to the virtual node associated with the first medical device so that virtual node may provide the message to the first medical voice command device. In some implementations, once the virtual node has been selected and paired with the command, virtual hub 230 may ignore and/or discard the information associated with the command that was received from the second medical voice command device (e.g., the device providing the lower signal strength).

In another embodiment, virtual node determiner 232 may determine the virtual node to pair to a message based on active monitoring of data received from all medical voice command devices subsequent to receiving a command, but prior to propagating the message. By actively monitoring each medical voice command device that shares a LAN, virtual node determiner 232 may determine which of the medical voice command devices is closest to the user at any particular point in time. Thus, when a message is generated, it may be propagated to the virtual node associated with the medical voice command device closest to the user, which may in turn provide it to that medical voice command device.

Each virtual node 240 may receive an audio signal from the corresponding medical voice command device. Virtual node communicator 233 may receive the audio signals from each virtual node and invoke signal strength monitor 234 to identify the audio signal with the greatest signal strength. In some implementations, the audio signals may be the measured volume of additional voice commands issued by the user. Alternatively, the audio signals may be the measured volume of any audio received by the medical voice command device regardless of whether a particular voice command was issued (e.g., if the user is speaking near the medical voice command device but has not issued a particular voice command).

Following the above example with two medical voice command devices, signal strength monitor 234 may determine one signal strength for the audio signal received from the first medical voice command device and a second signal strength for the audio signal received from the second medical voice command device. As noted above, the signal strength for the audio signal received from the first medical voice command device may have one volume and the signal strength for the audio signal received from the second medical voice command device may have a second volume. Signal strength monitor 234 may compare the signal strengths to determine the virtual node to pair with any subsequently generated messages.

Thus, if the volume of the audio signal received from the first medical voice command device is less than the volume of the audio signal received from the second medical voice command device, virtual node determiner 232 may pair the second virtual node (e.g., the virtual node 240 associated with the medical voice command device that generates the stronger audio signal) with any subsequently generated messages. Any messages generated by message generator 231 as a result of a subsequently issued voice command may then be propagated to the virtual node associated with the second medical voice command device so that virtual node may provide the message to the second medical voice command device. In some implementations, once the virtual node has been selected and paired with messages, virtual hub 230 may ignore and/or discard the information associated with commands received from the first medical voice command device (e.g., the device providing the weaker audio signal strength). Virtual node determiner 232 may send a notification to the virtual node 240 associated with the first medical voice command device (e.g., the device providing the weaker audio signal strength), to ignore subsequent voice commands.

In another embodiment, virtual node determiner 232 may determine the virtual node to pair to a message based on active monitoring of medical device signals received from a medical device (e.g., medical devices 102 of FIGS. 1A-B). By actively monitoring signals received from a medical device, virtual node determiner 232 may determine which of the medical voice command devices is closest to the medical device in use at any particular point in time. Thus, when a message is generated, it may be propagated to the virtual node associated with the medical voice command device closest to the medical device, which may in turn provide it to that medical voice command device.

In an illustrative example, a user may use an electronic thermometer to take the temperature of a member of the household. When the temperature is taken, the thermometer may be closest to a first medical voice command device. Prior to receiving any messages based on the temperature reading, the user may move within the household while retaining the electronic thermometer so that the thermometer is closer to a second medical voice command device. Any subsequently generated messages for the medical data received from the thermometer may be provided to the second medical voice command device since it is closest to the thermometer.

Each virtual node 240 may receive an indication of a signal strength for a signal between a medical device and a medical voice command device. Virtual node communicator 233 may receive the indications of signal strengths from each virtual node and invoke signal strength monitor 234 to identify the signal with the greatest signal strength. In some implementations, the signal strengths may be the transmission signal intensity from the medical device to a medical voice command device.

Following the above example with two medical voice command devices, signal strength monitor 234 may receive an indication of a first signal strength for a signal between the medical device and the first medical voice command device and an indication of a second signal strength for a signal between the medical device and the second medical voice command device. As noted above, the first signal strength may be the transmission signal intensity from the medical device to the first medical voice command device, and the second signal strength may be a transmission signal intensity from the medical device to the second medical voice command device. Signal strength monitor 234 may compare the signal strengths to determine the virtual node to pair with any subsequently generated messages based on the medical data received from the medical device.

Thus, if the signal strength for the signal between the medical device and the first medical voice command device is greater than the signal strength for the signal between the medical device and the second medical voice command device, virtual node determiner 232 may determine that the first virtual node (e.g., the virtual node 240 associated with the medical voice command device that receives a stronger transmission signal intensity from the medical device) is to manage any subsequently generated messages associated with the medical device. Any messages generated by message generator 231 as a result of a medical data received from the medical device may then be propagated to the virtual node associated with the first medical voice command device so that virtual node may provide the message to the first medical voice command device. In some implementations, once the virtual node has been selected and paired with messages, virtual node determiner 232 may send a notification to the virtual node 240 associated with the second medical voice command device (e.g., the device providing the weaker signal strength), that causes at least one of the second virtual node or its associated medical voice command device to ignore messages (e.g., transmission signals, medical data, etc.) from the from the medical device.

In another embodiment, virtual node determiner 232 may determine that a generated message is associated with medical data received from a medical device that is paired to a particular medical voice command device. Thus, when a message is generated, it may be propagated to the virtual node associated with the medical voice command device paired to the medical device. The virtual node may then, in turn, provide the message to its associated medical voice command device. In some implementations, medical device interactor 246 may be invoked by virtual node 240 when a medical device is paired with the medical voice command device associated with that virtual node 240. Medical device interactor 246 may then send the pairing information to virtual node communicator 233, which may store it in virtual node data structure 225.

Virtual node determiner 232 may determine that a generated message is associated with medical data received from a medical device. Virtual node determiner 232 may then access virtual node data structure 225 to determine whether the generated message for that medical device is to be propagated to a particular virtual node based on a stored pairing in virtual node data structure 225. Virtual node communicator 233 may then be invoked to propagate the message to the identified virtual node 240, which may then, in turn, provide the message to the associated medical voice command device.

In some implementations, virtual hub 230 may propagate a generated message to a mobile device (e.g., a mobile phone, tablet computer, laptop computer, etc.) associated with the user account. In one embodiment, a message may be propagated to a mobile device that is connected to the LAN associated with the user's account. In an illustrative example, the user may start an application on the mobile device that connects to the virtual hub via the LAN associated with the user account. The virtual mesh network may include a virtual node 240 associated with the mobile device to manage messages to be provided to the mobile device while the mobile device is connected to the LAN. When the mobile device is connected to the LAN, virtual hub 230 may update the information associated with the mobile device's virtual node in virtual node data structure 225 to indicate that the mobile device is connected. Similarly, when the mobile device is not connected to the LAN, virtual hub 230 may update the information associated with the mobile device's virtual node in virtual node data structure 225 to indicate that the mobile device is not connected.

When a message is generated by message generator 231, virtual node determiner 232 may determine that a mobile device is registered with the user account and associated with a virtual node 240. Virtual device determiner 232 may make this determination by accessing the virtual node data structure 225. Virtual device determiner 232 may use the information in virtual node data structure 225 to detect that the mobile device is connected to the LAN, and subsequently propagate the message to the mobile device's virtual node 240. The virtual node 240 may then invoke mobile device interactor 244 to send the message to the mobile device via the virtual mesh network. Mobile device interactor 244 may send the message to the mobile device via the LAN connection with the virtual node 240.

Alternatively, virtual node determiner 232 may use the information in virtual node data structure 225 to detect that the mobile device is not connected to the LAN. Virtual hub 230 may then transmit the message to the mobile device outside of the virtual mesh network. In one embodiment, virtual hub 230 may transmit the message via text message. Alternatively, virtual hub 230 may transmit the message to the mobile device using a data communication connection with a mobile application executing on the mobile device via the mobile device's mobile service provider. In one embodiment, the message may be propagated to the virtual node 240 associated with the mobile device, which may then invoke mobile device interactor 244 to transmit the message outside of the virtual mesh network communication connection to the user's LAN.

Figure 3:
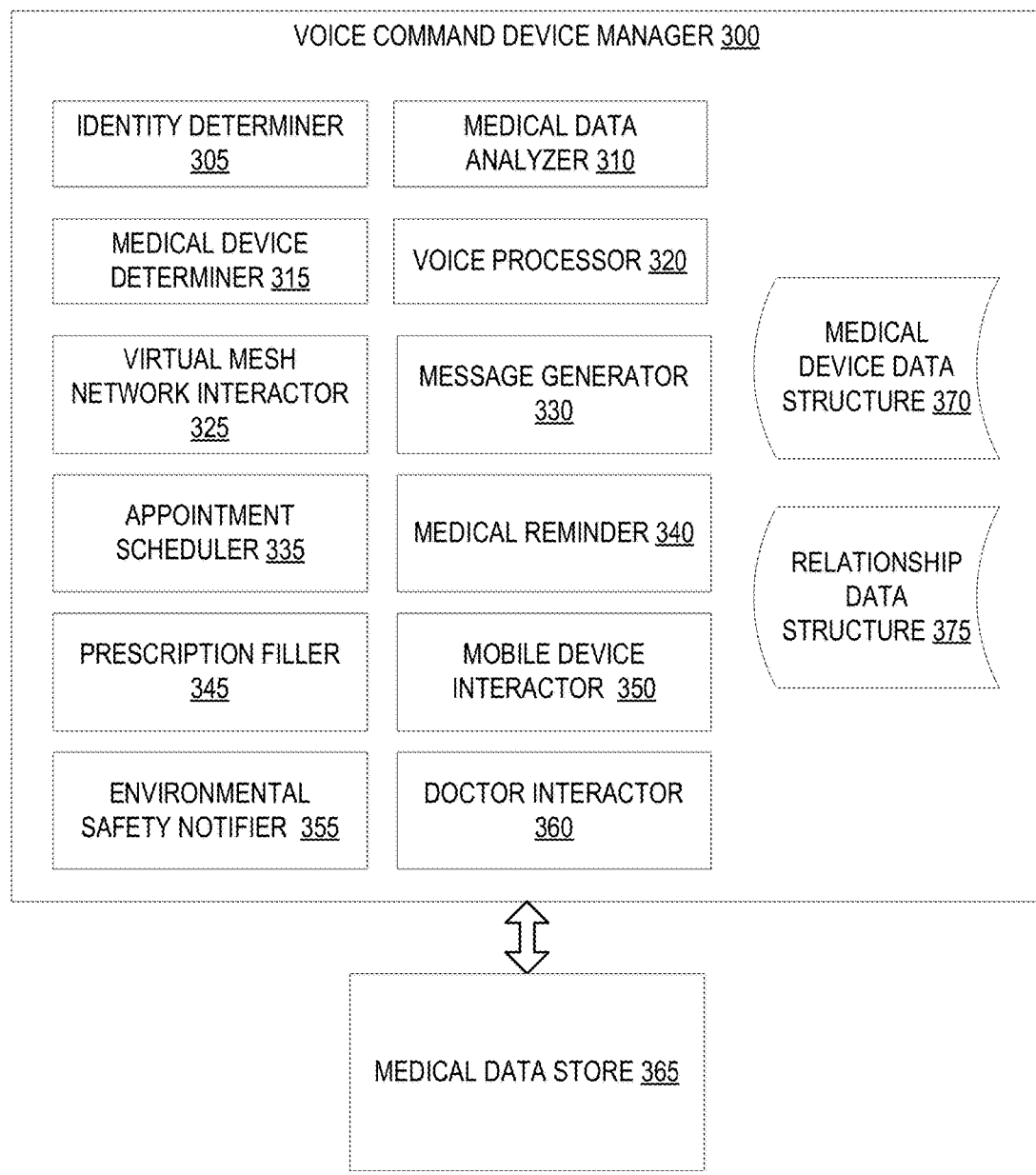
FIG. 3 is a block diagram of a voice command device manager that runs on a server computing device, in accordance with one embodiment.

FIG. 3 is a block diagram of a voice command device manager 300 that runs on a server computing device, in accordance with one embodiment. Voice command device manager 300 may execute, for example, on server computing device 110 of FIG. 1A. In some implementations, voice command device manager may be a component of a virtual mesh network. In one embodiment, voice command device manager 300 may be a component of message virtual hub 230 of FIG. 2. In another embodiment, voice command device manager 300 may execute separately from virtual hub 230, but communicate with a message generator component of virtual hub 230 (e.g., message generator 231 of FIG. 2).

In one embodiment, the voice command device manager 300 includes a virtual mesh network interactor 325, an identity determiner 305, a medical data analyzer 310, a voice processor 320 and/or a message generator 330. Voice command device manager 300 may additionally or alternatively include an appointment scheduler 335, a medical reminder 340, a prescription filler 345, a mobile device interactor 350, an environmental safety notifier 355 and a doctor interactor 360. The functionality of any one or more of these components may be combined into a single module or may be divided into multiple modules.

Virtual mesh network interactor 325 receives voice commands, information on intent and/or properties of voice commands (e.g., files such as JSON files that include a determined intent and properties associated with a voice command), medical data (e.g., measurements), and/or other data from medical voice command devices. Received voice commands may include voice activation commands, voice commands to generate measurements, voice inquiries asking for medical information, voice commands to schedule doctor appointments, voice commands to fill prescriptions, and so on. In embodiments, virtual mesh network interactor 325 receives this information via the virtual hub of a virtual mesh network (e.g., virtual hub 230 of FIG. 2).

After virtual mesh network interactor 325 receives a voice command from a voice command device (via the virtual hub of the virtual mesh network), voice processor 320 may process the voice command to determine contents of the voice command. For example, voice processor 320 may perform voice recognition to determine a nature of the voice command and/or to transcribe the voice command into a text command. In one embodiment, voice processor 320 uses a third party voice recognition service to perform the voice recognition. Examples of third party voice recognition services include Microsoft's Cortana®, Google's Google Now®, and Apple's Siri®.

Once the content of the voice command is determined by voice processor and/or the voice command is converted to a text command, voice processor 320 may compare the text command to a finite set of supported commands to determine which command most closely matches the text command. In one embodiment, voice processor 320 includes an intent parsing module (not shown) that determines an intent of the text command and/or parameters of the text command as described with reference to intent parsing module 274 of FIG. 2. If the command relates to the use of a medical device (e.g., taking a measurement using a medical device), then medical device determiner 315 may determine an appropriate medical device to satisfy the command. Alternatively, or additionally, the processing of the voice command and the determination of a medical device to use for satisfying the voice command may be determined by a medical voice command device that received the voice command. In such an embodiment, a file including an identified intent of the voice command and determined parameters of an voice command may be received by voice command device manager 300.

Some voice commands may be voice instructions to record particular measurements. For example, a user may include a non-connected medical device (e.g., a medical device that does not have wireless communication capability). In such an instance, the user may take a measurement using the medical device, and may issue a voice command to record the measurement.

In one embodiment, voice command device manager 300 includes a medical device data structure 370 that is associated with one or more user accounts associated with a particular household. The medical device data structure 370 may be a list, table, database, or other data structure that includes an identity of one or more medical voice command devices used for the one or more user accounts as well as the medical devices that are associated with those one or more user accounts.

A voice command may specify a particular type of measurement to be generated (e.g., a temperature measurement). The medical device data structure 370 may associate each medical device entry with one or more types of measurements. Medical device determiner 315 may compare the determined type of measurement to the entries in the medical device data structure 370 to determine a medical device that will be used to generate a measurement.

Once a medical device is determined, virtual mesh network interactor 325 may notify, via the virtual mesh network, the medical voice command device of the medical device to use to generate the measurement. Virtual mesh network interactor 325 may additionally or alternatively generate an instruction that will cause the voice command device to send a command to the determined medical device. The command may cause the medical device to generate the requested measurement and send that measurement back to the medical voice command device. The medical voice command device will then return the measurement back to virtual mesh network interactor 325 via the virtual mesh network.

Medical devices may also generate measurements/medical data independently (e.g., based on a user interacting with the medical devices) and send the measurements/medical data to the voice command device. The medical voice command device may then send the measurements/medical data to voice command device manager 300.

A single voice command device will typically be associated with multiple different user accounts and/or with multiple different entities. For example, a single household may include a mother, a father, and one or more children. Each member of the household may have a separate user account that is associated with the voice command device. Accordingly, when a measurement or other medical data is generated, identity determiner 305 determines who the measurement was for. Identity determiner 305 determines the identity of an entity (a living entity such as a household member, patient, or other living entity) for whom a measurement/medical data was generated, as well as a user account of that entity. Identity determiner may use one or more heuristics and/or identity identification rules to determine the identity of the entity.

If a measurement was initiated by a medical voice command device responsive to a voice command from a user, then the voice command may have been preceded by a voice activation command. Additionally, the voice command may have specified the identity of the entity using a name, a possessive pronoun or a possessive adjective.

A voice activation command is a particular phrase that a user speaks to activate a medical voice command device. Voice command device manager 300 and/or the medical voice command device itself may include multiple voice activation command recordings, where each voice activation command recording is associated with a particular entity (e.g., with a particular user account). Identity determiner 305 may perform voice print identification by comparing a received voice activation command to voice activation commands stored in a data store that are associated with a particular voice command device from which the voice activation command was received. Identity determiner 305 may determine that the speaker of the voice activation command corresponds to the user account having the recorded voice activation command that most closely matches the received voice activation command.

In one embodiment, voice command device manager includes a table, tree, web, database, or other relationship data structure 375 that identifies the relationships between the different user accounts associated with a medical voice command device. The relationship data structure 375 may indicate the type of relationship between each user account. For example, if a household includes a mom, a dad, a son, and a daughter, then the relationship data structure may link the dad to the mom by a husband-wife relationship, may link the dad to the son by a father-son relationship, and may link the dad to the daughter by a father-daughter relationship.

Once the speaker of the voice command is known, identity determiner 305 may determine a relationship between the speaker and the entity if a possessive pronoun or possessive adjective was used in the voice command. In one embodiment, the relationship is determined using the relationship data structure 375. For example, identity determiner 305 may determine aa first entry in the relationship data structure that corresponds to the speaker based on the previously determined identity of the user. Identity determiner 305 may then determine a second entry in the relationship data structure based on the possessive pronoun or the possessive adjective in the voice command, wherein the second entry indicates the identity of the living entity. For example, if the voice command was "take my daughter's temperature," and the speaker was the father in the previous example, then the possessive adjective "my" followed by "daughter" would be compared to the relationship data structure 375 to determine the user account that has the father-daughter relationship with the speaker.

In a simpler example, a speaker may use a possessive pronoun or possessive adjective to refer to a measurement for themselves. For example, a user may state, "take my blood pressure." In such an instance, that user may have been previously identified by the voice print identification performed using the voice activation command. Accordingly, identity determiner 305 may determine that the measurement is for the user account of the speaker.

A user command may also refer to an entity by name. For example, a speaker may state, "take Johnny's temperature." In such an instance, voice processor 320 may have processed the voice command to determine a name. Alternatively, the name may have been a parameter of the voice command that was received from the medical voice command device. However, many spoken names may sound similar to voice recognition systems. For example, a user may say "Hanna," but the voice recognition system may determine that the user said "Anna." Accordingly, the name determined by voice processor 320 may be treated as a candidate name. Identity determiner 305 may then compare the determined candidate name to the names of the entities for each user account associated with a voice command device. The name that most closely matches the candidate name may be determined to be the name of the stated entity, and the user account having that name may be identified as the user account to use for storing medical data associated with the voice command.

In an example, one user account associated with a voice command device may be for Hanna, another user account may be for Mark, another user account may be for Jennifer, and another user account may be for Hank. The voice processor 320 may have interpreted a voice command as naming Anna. The candidate name of Anna may be compared by identity determiner 305 to the names in each of the user accounts (e.g., to Hanna, to Mark, to Jennifer and to Hank). Based on the comparison, identity determiner 305 may determine that Hanna is the closest name to the candidate name of Anna, and so may determine that the identity of the entity associated with the measurement is Hanna.

In one embodiment, identity determiner computes, for each user account, a probability value that a candidate name matches a name associated with that user account. The user account with the highest probability value is determined to be the user account for which a measurement was taken. In one embodiment, a K nearest neighbors function is used to determine the probability values.

In one embodiment, voice command device manager 300 stores voice recordings of entity names. Each user account may include one or multiple voice recordings stating the associated entity's name. In such an implementation, identity determiner 305 may compare a received voice command to the voice recordings in each user account to identify a closest match. A user account having a voice recording that most closely matches the recitation of a name in the voice command may be identified as the user account of the entity having that name.

Identity determiner 305 may additionally use one or more heuristics to determine an identity of the entity associated with a measurement. The heuristics that are used may be based at least in part on the nature of the measurement. For example, some medical data such as a user's weight is relatively steady (e.g., changes slowly). Accordingly, if a weight measurement is received, identity determiner 305 may compare the received weight measurement to stored weight measurement values for some or all of the user accounts associated with the medical voice command device. The stored weight measurement values may be most recent weight measurement values of the user accounts. For each such weight measurement value that is compared to the received weight measurement value, a difference may be determined. In one embodiment, the user account for which the smallest difference was computed is determined to be the user account of the entity for which the weight measurement was generated. In one embodiment, a maximum difference threshold is applied to the computed weight value differences. The maximum difference threshold may be, for example, 10% of the most recent weight measurement value. If the computed difference exceeds the maximum difference threshold, then identity determiner 305 may determine that the identity of the entity for which the measurement was taken is indeterminate.

Some types of medical data/measurements are generally only collected by people who have specific health conditions. For example, a blood sugar level measurement is generally only generated for people who have diabetes. Similarly, blood pressure measurements are generally only taken by people who have high blood pressure. Accordingly, if such a measurement is received, identity determiner 305 may determine which, if any, user accounts indicate that the users associated with those user accounts have the related medical condition. Additionally, or alternatively, identity determiner may determine which, if any, user accounts have stored measurements of the same type as the received measurement. If a single user account indicates the particular medical condition and/or has stored measurements of the same type as the received measurement, then identity determiner 305 may determine that single user account as belonging to the entity for which the measurement was generated.

As discussed previously, measurements/medical data may be initiated by a medical voice command device (in which case the measurements will be associated with a voice command), or the measurements/medical data may be initiated by a medical device. If a measurement was initiated by a medical device, then there likely will not be a voice command associated with that measurement. In such an instance, only some of the above discussed techniques for determining the identity of the entity for which the measurement was generated may be applied (e.g., the heuristics that do not involve a spoken name).

In some instances identity determiner 305 may be unable to determine the identity of the entity for whom a measurement was taken. In such an instance, message generator 330 may generate an inquiry that asks a user to identify the identity of the entity. Virtual mesh network interactor 325 may then send the inquiry to the virtual hub of the virtual mesh network. As described above with respect to FIG. 2, the virtual hub may propagate the message to a virtual node of the virtual mesh network, which may then provide the message to an associated voice command device. The voice command device may output the inquiry and receive a user's voice response. The generated inquiry may be a voice inquiry or a text inquiry. If a text inquiry is generated, then voice processor 320 may process the text inquiry to convert the text inquiry into a voice inquiry. Alternatively, the text inquiry may be sent to the medical voice command device, and the medical voice command device may convert the text inquiry into a voice inquiry before playing the voice inquiry. Virtual mesh network interactor 325 may then receive the voice response via the virtual mesh network, and voice processor 320 and identity determiner 305 may process the voice response as discussed above to determine the identity of the entity. Alternatively, the medical voice command device may process the voice response to determine an intent and/or parameters of the voice response, and may send a file including the intent and/or parameters of the voice response to voice command device manager 300.

Once an entity (e.g., a user account) associated with a measurement is determined, voice command device manager 300 stores the measurement in a medical data store 365 in an entry for that user account. The stored measurement then becomes part of a health record for the entity having that user account, and may later be accessed. The medical data store may be a database, file system, or other data storage.

After a measurement/medical data is received by voice command device manager 300, message generator 330 may process the measurement to generate a message indicating the measurement value. The message may be a voice output of the measurement, such as an audio file that, when played, outputs a voice speaking the measurement value. Alternatively, the message may be a text message that indicates the measurement value. The text message may be processed by voice processor 320 in some embodiments to convert the text message into a voice message.

Medical data analyzer 310 may analyze a received measurement/medical data 310, and may determine additional medical information associated with the measurement. For example, medical data analyzer 310 may compare the measurement to a database of measurements and/or to known healthy and unhealthy ranges of values for the measurement. Based on the comparison of the measurement to the data base of measurements, the known healthy measurements and/or the known unhealthy measurements, message generator 330 may include in the generated voice output an indication of whether the measurement is a healthy measurement or an unhealthy measurement. Message generator 330 may additionally add other information to the voice output, such as a question of whether the user wants to schedule a reminder to take a particular medication (e.g., Acetaminophen), a question of whether the user wants to schedule a doctor appointment, a question of whether the user wants to call an ambulance, and so on.

Medical data analyzer 310 may compare the measurement to one or more thresholds, and may cause message generator 330 to generate different instructions, notices and/or warnings based on whether the measurement exceeds one or more of the thresholds. For example, some temperatures may be likely to cause seizure. If a temperature measurement indicates a temperature that is likely to cause a seizure, then the message may include a recommendation to seek medical assistance right away. The thresholds to which the measurement is compared may be dependent on the entity (e.g., user account) associated with the measurement. For example, different thresholds may be applied for an infant than for a child or an adult.

A user account may include a history of measurements and/or one or more goals related to the measurements. Medical data analyzer 310 may compare the received measurement to the historical measurement data for a user account and/or to the goal(s). Medical data analyzer may then determine statistical information about the current measurement as compared to the previous measurements. Additionally, medical data analyzer 310 may determine whether the user has reached a goal and/or how far they are away from the goal. Message generator 330 may include such information in the message that is generated. Once the message is generated, virtual mesh network interactor 325 sends the message to the virtual hub of the virtual mesh network so that it may be propagated to the appropriate virtual node, and subsequently provided to a voice command device (e.g., as a text message or a voice message), which then plays a voice output of the message.

Some voice commands received from users may be inquiries asking about previously received medical data of an individual. Responsive to such an inquiry, voice processor 320 may process the voice inquiry to determine the nature of the inquiry (e.g., to parse the inquiry and determine an intent and/or properties of the voice inquiry). Alternatively, intent and parameters of a voice command may be received instead of or in addition to the voice command. Identity determiner 305 may process an output of voice processor 320 (or the intent and/or voice command parameters that were received) to determine an identity of the user account associated with the inquiry. Medical data analyzer 310 may then analyze the medical data in the medical data store 365 for the indicated user to generate an answer to the inquiry. Message generator 330 then generates a message with the answer, which is sent to the voice command device via the virtual mesh network by virtual mesh network interactor 325. For example, a voice inquiry may ask "when was Johnny last sick," or "did Johnny have a fever last month," or "what weight percentile is Anna in for her age." After a particular user account for a user named Johnny is determined, medical data analyzer 310 may then analyze the medical data for that user account to determine an answer to the inquiry. For example, if the inquiry asked for when Johnny was last sick, medical data analyzer may identify a last date (e.g., Oct. 21, 2015) at which an elevated temperature was recorded for Johnny. Message generator 330 may then generate a response message stating "Johnny was last sick on Oct. 21, 2015, with a recorded temperature of X."

In one embodiment, voice command device manager 300 includes medical reminder 340. At any time, a user may issue a voice command to schedule a reminder to perform an action such as exercise, take medication, schedule a doctor appointment, and so on. Reminders may also be generated automatically based on information about a user account, such as known medical conditions of the user (e.g., diabetes), known medication prescribed to the user, known scheduled appointments of the user, and so on.

The voice command may indicate when the reminder should be issued. Alternatively, the time and/or date to issue the reminder may be determined automatically based on other information. For example, if a user is taking a prescribed medication, then the reminder may be scheduled automatically based on the prescribed frequency for taking that medication.

Medical reminder 340 may schedule an appropriate reminder for a particular date and time. If the reminder is to be repeated at a particular frequency, then a recurrent reminder may be scheduled. At the scheduled time, message generator 330 may generate a reminder, which may then be sent to the medical voice command device.

In one embodiment, voice command device manager 300 includes prescription filler 345. A doctor may prescribe medication to a user, and that prescription may be added to a user account either by the doctor's office or by the user. Prescription filler 345 may automatically contact a local pharmacy for the user and place an order for filling the prescription on the user's behalf. The local pharmacy may be indicated as a preferred pharmacy in the user account or may be determined based on a location of the user. Once the prescription is filled, the pharmacy may send a notice to the medical voice command device manager 300, and message generator 330 may generate a message stating that the prescription is ready for pickup. If a particular pharmacy does not include a medication in stock, prescription filler 345 may search for nearby pharmacies that have the medication in stock, and may place the prescription order with one of the nearby pharmacies.

In one embodiment, voice command device manager 300 includes appointment scheduler 335. Appointment scheduler 335 interfaces with doctor's offices and automates scheduling of doctor appointments for users. A user may issue a voice command to schedule a doctor appointment to the voice command device. Appointment scheduler 335 may then review a calendar of the user to determine their availability for an appointment. Appointment scheduler 335 may query the doctor's office asking for the next available appointment times. Appointment scheduler 335 may then request an earliest appointment time for which both the user and the doctor have availability, and may add that appointment to the user's calendar.

In one embodiment, voice command device manager 300 includes mobile device interactor 350. Mobile device interactor may send messages such as text reminders to a mobile device of a user in addition to, or instead of, sending voice reminders to the medical voice command device.

In one embodiment, voice command device manager 300 includes environmental safety notifier 355. Environmental safety notifier 355 determines a current location and/or predicted future location of a user and/or a location of the medical voice command device, and accesses one or more third party services to determine environmental safety information about one or more of those locations. For example, environmental safety notifier 355 may access a third party service to determine a pollen count in a location for a current day, an air pollution level for the location, any disaster warnings for the location (e.g., flood advisory, fire advisory, etc.), and so on. Voice output generator 330 may then generate a voice output that indicates the environmental safety information. Additionally, medical reminder 340 may issue a medical reminder for one or more users if the environmental safety information exceeds certain thresholds. For example, if the pollen count is above a threshold, then medical reminder 340 may issue a reminder to carry an inhaler.

In one embodiment, voice command device manager 300 includes a doctor interactor 360. A user account may include information for one or more doctors of a user. This may include information on a server computing device associated with that doctor, how to interface with the server computing device, login information for the user into the server computing device of the doctor, and so on. Alternatively, or additionally, a doctor may have his or her own account with medical data store 365, and may access a user's medical data based on a doctor-patient relationship between the user account of the doctor and the user account of the patient.

Doctor interactor 360 may perform actions such as sending medical data of a user to that user's doctor. Such actions may be performed automatically or responsive to a voice command to do so. Alternatively, or additionally, a link may be sent to the doctor (e.g., to an email address of the doctor), where the link is a link to access the medical data of the user.

Figure 4:
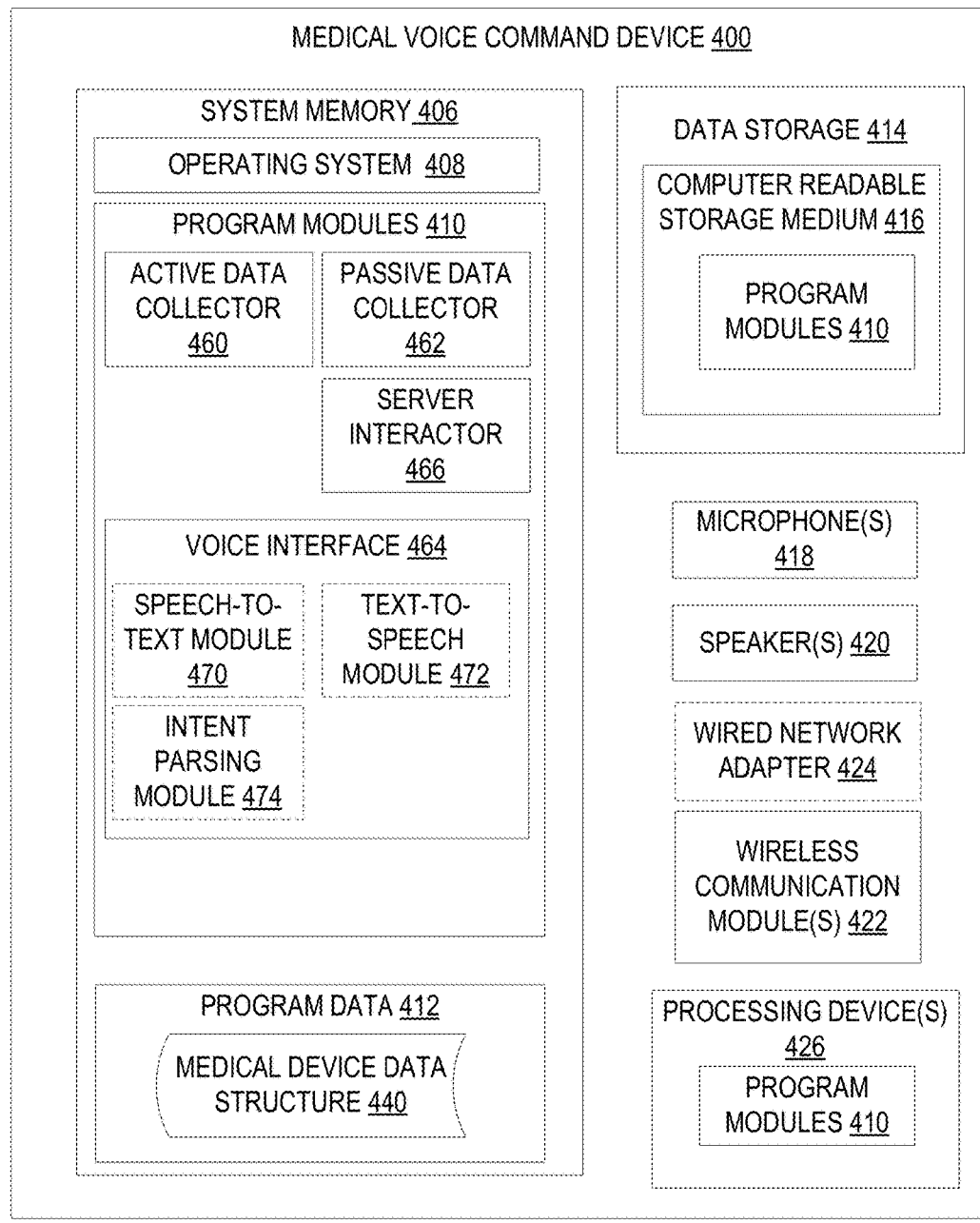
FIG. 4 is a block diagram illustrating one embodiment of a medical voice command device.

FIG. 4 is a block diagram illustrating one embodiment of a medical voice command device 400. The medical voice command device 400 may be a home medical hub, and may correspond to medical voice command devices 105A-C of FIGS. 1A-B.

The medical voice command device 400 includes one or more processing devices 226, such as one or more central processing units (CPUs), microcontrollers, field programmable gate arrays (FPGAs), digital signal processors (DSPs), and/or other types of processors. The medical voice command device 400 also includes system memory 406, which may correspond to any combination of volatile and/or non-volatile storage mechanisms. The system memory 406 stores information which provides an operating system component 408, and various program modules 410 such as active data collector 460, passive data collector 462, voice interface 464 and server interactor 466. The medical voice command device 400 performs functions by using the processing device(s) 430 to execute instructions provided by the system memory 406. Alternatively, the program modules 410 may be implemented in firmware, hardware, or a combination of software, firmware and/or hardware.

The medical voice command device 400 also includes a data storage device 414 that may be composed of one or more types of removable storage and/or one or more types of non-removable storage. The data storage device 414 includes a non-transitory computer-readable storage medium 416 on which is stored one or more sets of instructions embodying any one or more of the methodologies or functions described herein. As shown, instructions for one or more of the program modules 410 may reside, completely or at least partially, within the computer readable storage medium 416, system memory 406 and/or within the processing device(s) 426 during execution thereof by the medical voice command device 400, the system memory 406 and the processing device(s) 426 also constituting computer-readable media.

The medical voice command device 400 includes one or more microphones 418 (e.g., a microphone array) that act as the input devices for the medical voice command device 400. The medical voice command device 400 additionally includes one or more speakers (e.g., an array of speakers) that act as the output devices for the medical voice command device 400. While the medical voice command device may additionally include other input devices (e.g., (e.g., keyboard, mouse device, touchpad, touchscreen, specialized selection keys, etc.) and/or output devices (e.g., displays, printers, tactile feedback mechanisms (e.g., vibrators), etc.), the primary user interface with the voice command device 400 is envisioned to be a voice interface via the microphones 418 and speakers 420.

The medical voice command device 400 further includes one or more wireless communication modules 422, such as a Bluetooth module, a Zigbee module, a Wi-Fi module, and so forth. The wireless communication modules 422 may additionally or alternatively include a wireless modem to allow the medical voice command device 400 to communicate via a wireless network provided by a wireless carrier. The wireless modem may be configured to communicate using wireless communication standards and protocols such as global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX), and so on.

In one embodiment, the medical voice command device 400 includes a Bluetooth wireless communication module to interface with medical devices via Bluetooth and a Wi-Fi wireless communication module to wirelessly connect to a LAN. The medical voice command device 400 may additionally include a wired network adapter 424 such as an Ethernet adapter in some implementations. Other combinations of wireless communication modules 422 and/or a wired network adapter 424 may also be used.

The active data collector 460, passive data collector 462, voice interface 464 and/or server interactor 466 may be modules of a voice command device program that runs on the processing device 426. Alternatively, one or more of the active data collector 460, passive data collector 462, voice interface 464 and/or server interactor 466 may be separate programs that execute on the processing device 426. The program modules 410 may be programmed to execute on the iOS® operating system, the Android® operating system, the Windows® operating system, a Linux® operating system, or another operating system.

Voice interface 464 may be responsible for interpreting voice commands received via the microphones and outputting voice responses and other voice outputs via speakers 420. System memory 406 may include program data 412 that may include a set of supported voice commands. When a new voice command is received, voice interface 464 may compare the received voice command to the set of recognized voice commands to identify the voice command. If the received voice command varies from one of the included voice commands by less than a threshold, then voice interface 464 may identify the received voice command as corresponding to the matching supported voice command. If the received voice command does not match a supported voice command in the set of supported voice commands, then server interactor 466 may forward the voice command to a server computing device for further processing. The server interactor 466 may then receive instructions based on the voice command (which may have been parsed and recognized by the server computing device) and/or may receive a voice output for voice interface 464 to play via speakers 420. Alternatively, in some implementations all voice commands are forwarded by server interactor 466 for processing. In some implementations, server interactor 466 may communicate with the virtual hub of a virtual mesh network on the server computing device as described above with respect to FIGS. 1-2.

In one embodiment, voice interface 464 includes a speech-to-text module 470. The speech-to-text module 470 may perform automated transcription of a voice command or other voice input to transform the voice command into a text command. In one embodiment, the speech-to-text module 470 includes an application programming interface (API) to call a third party voice recognition service such as Siri®, Cortana®, Google Now®, and so on. In such an implementation, speech-to-text module 470 sends an audio file to the third party voice recognition service, and receives a text version of the voice command.

In one embodiment, voice interface 474 further includes an intent parsing module 474. The intent parsing module 474 parses the text version of the voice command to determine an intent of the voice command and one or more parameters of the voice command. The intent parsing module 474 may determine, for example, a requested action to perform (e.g., take temperature), an object to perform the action on (e.g., Johnny's temperature), a time to perform the action, and so on. This may include determining which supported operation is being requested. In one embodiment, the intent parsing module 474 includes an API for a third party intent parsing service such as Microsoft's Language Understanding Intelligent Service (LUIS).

Various supported voice commands may be associated with one or more operations to be performed by the medical voice command device and/or by the remote server computing device. One example supported voice command is a command to generate medical data and/or to take a measurement associated with medical data. For example, a received voice command may be to "take my temperature." If a "take measurement" command is identified, medical voice command device and/or the server computing device determines a medical device that will generate the measurement.

In one embodiment, medical voice command device includes a list, table or other data structure (referred to herein as the medical device data structure 440) that indicates each of the medical devices that are associated with the medical voice command device (e.g., that are in a same household as the medical voice command device and/or that are owned by a user of the medical voice command device). The medical device data structure 440 may indicate the types of measurements that each of the listed medical devices is capable of producing.

In one embodiment, the medical voice command device comes pre-populated with information on the most popular medical devices. A user may indicate to the medical voice command device which medical devices that user owns, and the indicated medical devices may be added to the medical device data structure. If medical devices are indicated for which the medical voice command device does not include preloaded information, then the medical voice command device may query the server computing device for information on these devices.

Responsive to a command to take a measurement, the server computing device and/or voice interface 464 (e.g., the intent parsing module 474 of the voice interface 464) determine the type of measurement to be taken. The voice interface 464 and/or server computing device additionally determine (e.g., by comparing the determined measurement to the medical device data structure 440) the medical device to generate the measurement.

Medical device data structure 440 may additionally include information usable to communicate with each of the medical devices. This may include an indication of a wireless communication protocol to use for communication with a medical device, a media access control (MAC) address of the medical device, a unique identifier of the medical device, a security key to use for communications with the medical device, and so on. Active data collector 460 may use the information from the medical device data structure 440 to communicate with the medical device via an appropriate wireless communication module. This may include sending a command to the medical device to cause the medical device to generate the measurement. Active data collector 460 may then receive the measurement and/or other medical data from the medical device. Server interactor 466 may send the measurement/medical data to the server computing device via the wired network adapter 424 or an appropriate wireless communication module 422.

Medical voice command device 400 may default to a low power state. While the medical voice command device 400 is in the low power state, it may listen for two types of input. The first type of input is unsolicited wireless messages from medical devices. The second type of input is a voice activation command from a user. Responsive to detecting either type of input, medical voice command device 400 transitions out of the low power state and into a fully powered state.

While the medical voice command device is in the low power state, passive data collector 462 may periodically or continuously scan for unsolicited wireless messages (e.g., wireless advertising packets) from medical devices. Passive data collector 262 may use the medical device data structure 440 to determine which devices might send unsolicited messages. The medical device data structure 440 may indicate what communication protocol such medical devices use, what ports they might send information on, and/or other information that is usable to determine how passive data collector 462 is to scan for unsolicited messages. Passive data collector in one embodiment scans the appropriate frequencies for unsolicited messages (e.g., the appropriate protocols). Responsive to receipt of an unsolicited message that includes medical data (e.g., a measurement), medical voice command device 400 powers on and server interactor 466 forwards that medical data on to the server computing device.

When medical data, a voice command and/or an intent and properties from a voice command are sent by server interactor 466 to the server computing device, the server computing device attempts to identify an entity associated with the medical data and/or voice command. If the server computing device is unable to determine the identity with the information that it presently has, then it generates an inquiry and sends that inquiry to medical voice command device. The inquiry may be a voice inquiry or a text inquiry. Voice interface 464 may then play the voice inquiry (e.g., an inquiry asking who the medical data is for), and receives a voice response. In one embodiment, voice interface 464 includes a text-to-speech module 472. The text-to-speech module 472 may include an API that calls a third party text-to-speech service. If the received inquiry is a text inquiry, then text-to-speech module 472 may process the text inquiry to convert it into a voice inquiry. Voice interface 464 may then play the voice inquiry using speakers 420. Server interactor 466 then sends the voice response to the server computing device to provide the server computing device with additional information to identify the entity to associate with the medical data (e.g., the patient or living entity for which a medical measurement was generated). The intent and/or parameters of the voice response may be determined by processing the voice response using speech-to-text module 470 to generate a text response and then subsequently processing the text response using intent parsing module 474.

FIGS. 5-9 are flow diagrams illustrating methods of managing a virtual mesh network associated with medical voice command devices that share a local area network (LAN). These methods may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. Some methods may be performed by a server computing device executing a virtual mesh network manager, such as virtual mesh network manager 200 of FIG. 2.

For simplicity of explanation, the methods are depicted and described as a series of acts. However, acts in accordance with this disclosure can occur in various orders and/or concurrently and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

Figure 5:
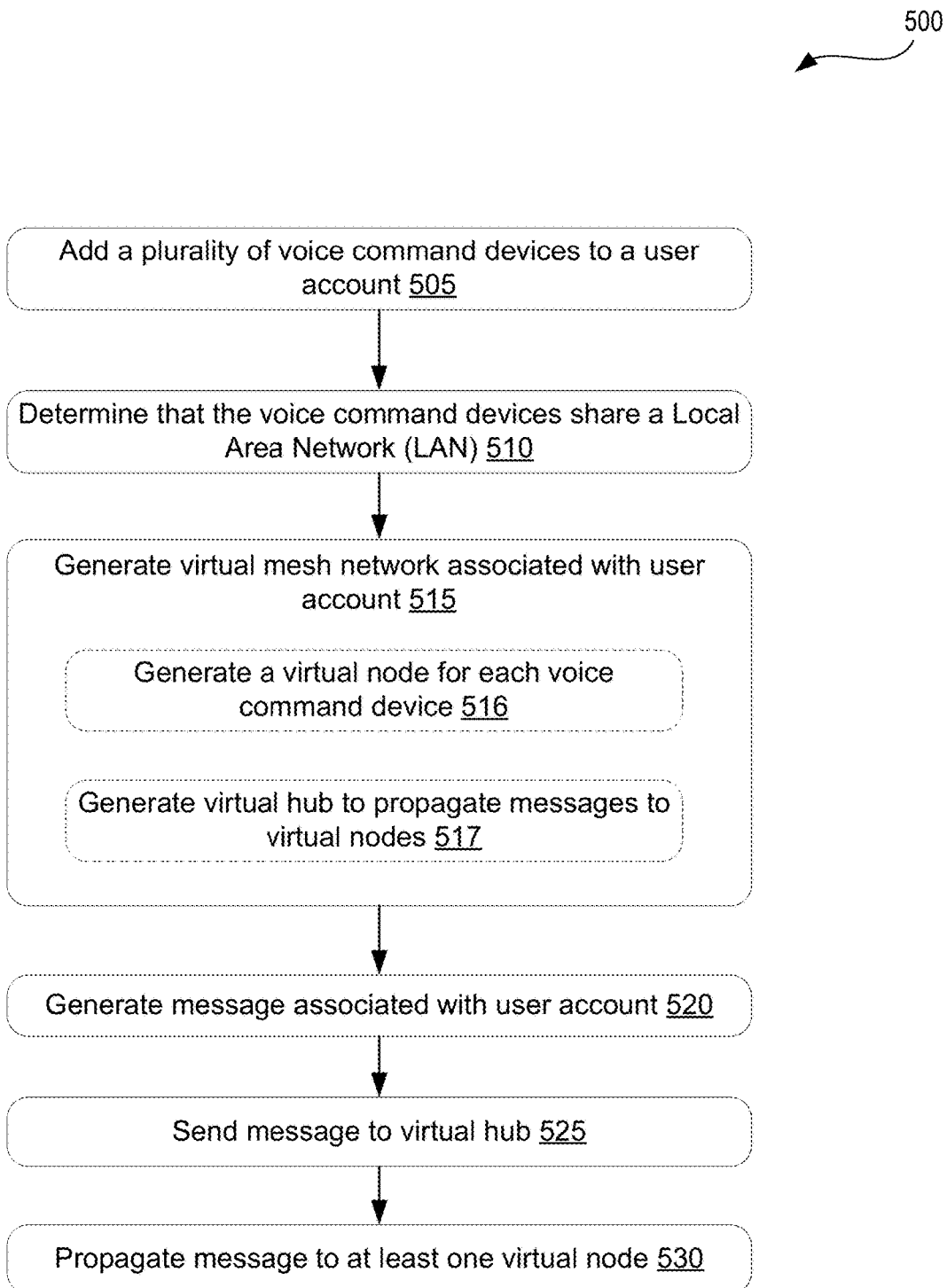
FIG. 5 is a flow diagram illustrating one embodiment for a method of managing a virtual mesh network associated with medical voice command devices that share a local area network.

FIG. 5 is a flow diagram illustrating one embodiment for a method 500 of managing a virtual mesh network associated with medical voice command devices that share a local area network. At block 505 of method 500, processing logic adds a plurality of voice command devices to a user account. At block 510, processing logic determines that the plurality of voice command devices share a local area network (LAN). At block 515, processing logic generates a virtual mesh network associated with the user account. In some implementations, the virtual mesh network includes a virtual hub and a plurality of virtual nodes, where each virtual node is associated with a corresponding voice command device of the plurality of voice command devices that share the LAN. In some implementations, processing logic may invoke block 516 to generate a virtual node for each voice command device of the plurality of voice command devices that share the LAN. Processing logic may additionally invoke block 517 to generate the virtual hub associated with the user account to propagate messages to at least one of the virtual nodes.

At block 520, processing logic generates a message associated with the user account. At block 525, processing logic sends the message to the virtual hub of the virtual mesh network. At block 530, processing logic propagates the message to at least one of the virtual nodes, where the virtual node provides the message to the corresponding voice command device.

Figure 6:
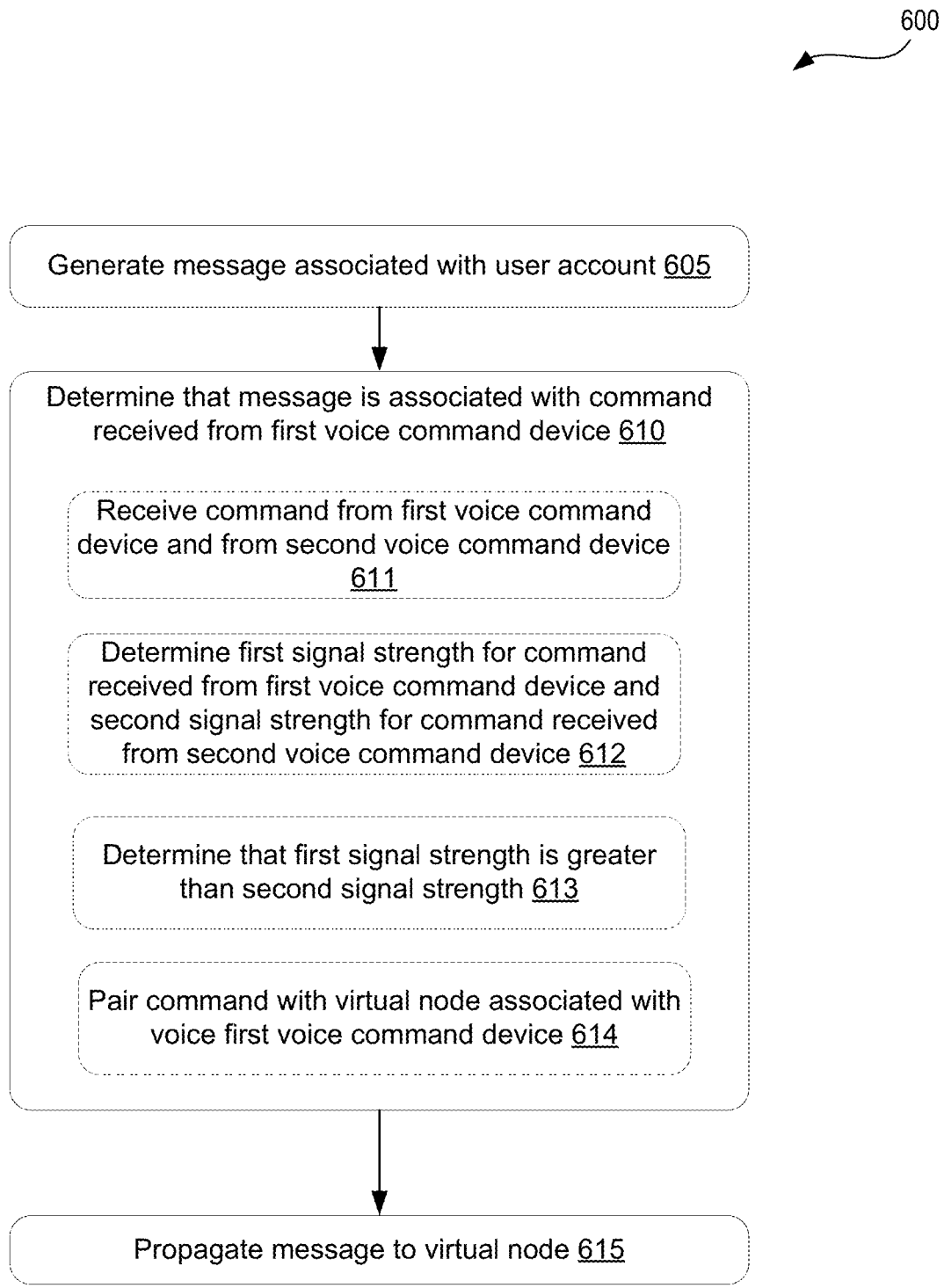
FIG. 6 is a flow diagram illustrating one embodiment for a method of propagating messages by a virtual hub to a virtual node of a virtual mesh network.

FIG. 6 is a flow diagram illustrating one embodiment for a method 600 of propagating messages by a virtual hub to a virtual node of a virtual mesh network. At block 605 of method 600, processing logic generates a message associated with a user account. At block 610, processing logic determines that the message is associated with a command received from a first voice command device, where the first voice command device is associated with a first virtual node.

In some implementations, processing logic may make this determination by invoking blocks 611-614. At block 611, processing logic receives the command from the first voice command device and from a second voice command device, where the second voice command device is associated with a second virtual node. At block 612, processing logic determines a first signal strength for the command received from the first voice command device and a second signal strength for the command received from the second voice command device.

At block 613, processing logic determines that the first signal strength is greater than the second signal strength. At block 614, processing logic pairs the command with the first virtual node associated with the first voice command device. At block 615, processing logic propagates the message to the first virtual node, wherein the first virtual node is to provide the message to the first voice command device.

Figure 7:
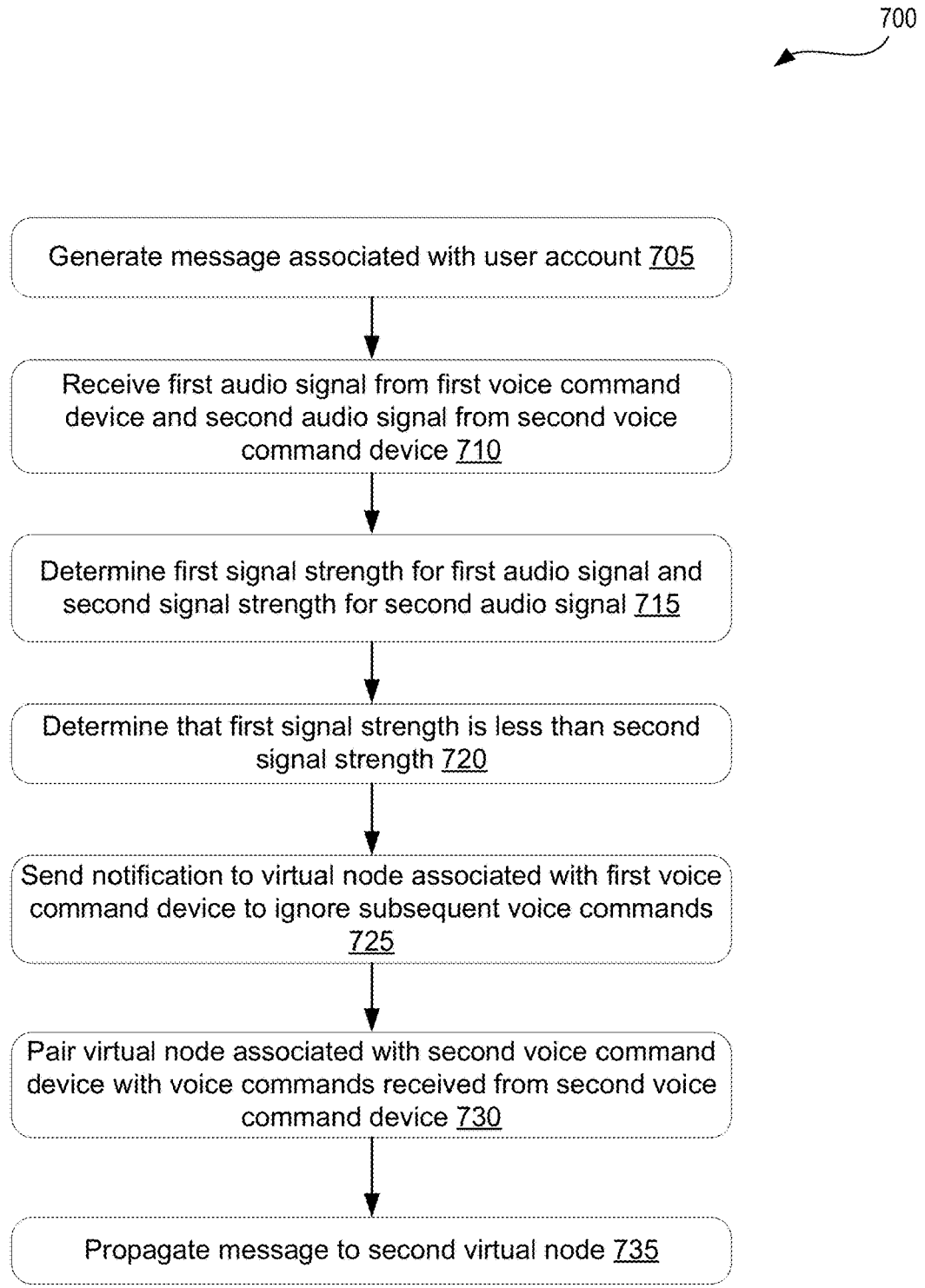
FIG. 7 is a flow diagram illustrating another embodiment for a method of propagating messages by a virtual hub to a virtual node of a virtual mesh network.

FIG. 7 is a flow diagram illustrating another embodiment for a method 700 of propagating messages by a virtual hub to a virtual node of a virtual mesh network. At block 705 of method 700, processing logic generates a message associated with a user account. At block 710, processing logic receives a first audio signal from a first voice command device that is associated with a first virtual node and a second audio signal from a second voice command device that is associated with a second virtual node. At block 715, processing logic determines a first signal strength for the first audio signal received from the first voice command device and a second signal strength for the second audio signal received from the second voice command device. In some implementations, the signal strength may be the measured volume of the voice command.

At block 720, processing logic determines that the first signal strength is less than the second signal strength. At block 725, processing logic sends a notification to the first virtual node to ignore subsequent voice commands received from the first voice command device. At block 730, processing logic pairs the second virtual node with messages associated with voice commands received from the second voice command device. At block 735, processing logic propagates the message to the second virtual node, wherein the second virtual node is to provide the message to the second voice command device.

Figure 8:
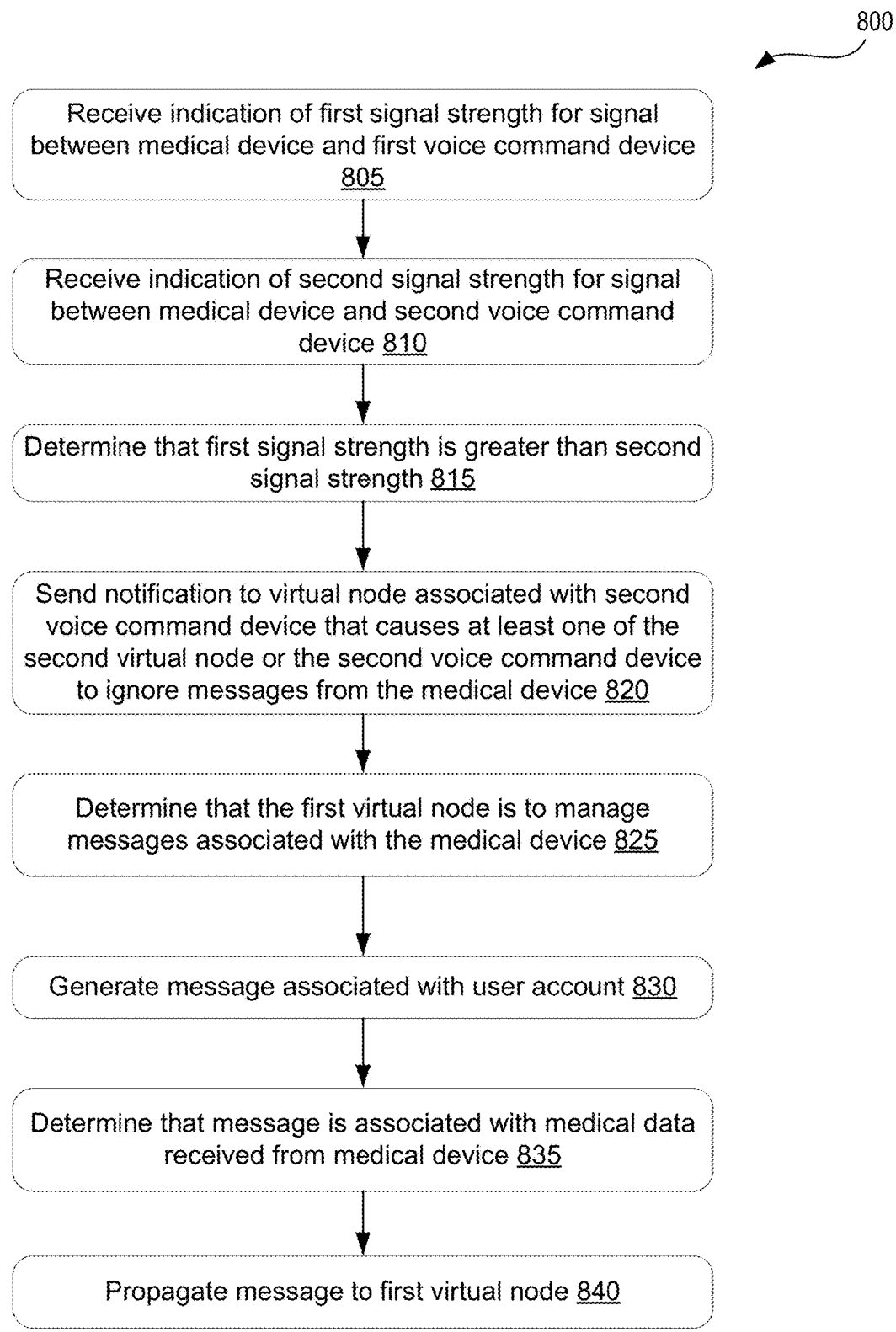
FIG. 8 is a flow diagram illustrating another embodiment for a method of propagating messages by a virtual hub to a virtual node of a virtual mesh network.

FIG. 8 is a flow diagram illustrating another embodiment for a method 800 of propagating messages by a virtual hub to a virtual node of a virtual mesh network. At block 805 of method 800, processing logic receives, from a first voice command device, an indication of a first signal strength for a signal between a medical device and the first voice command device, wherein the first voice command device is associated with a first virtual node. In some implementations, the first signal strength may be a transmission signal intensity from the medical device to the first voice command device.

At block 810, processing logic receives, from a second voice command device, an indication of a second signal strength for a signal between the medical device and the second voice command device, wherein the second voice command device is associated with a second virtual node. In some implementations, the second signal strength may be a transmission signal intensity from the medical device to the second voice command device. At block 815, processing logic determines that the first signal strength received at block 805 is greater than the second signal strength received at block 810.

At block 820, processing logic sends a notification to the second virtual node that causes at least one of the second virtual node or the second voice command device to ignore messages from the medical device. At block 825, processing logic determines that the first virtual node is to manage messages associated with the medical device. At block 830, processing logic generates a message associated with a user account. At block 835, processing logic determines that the message is associated with medical data received from the medical device. At block 840, processing logic propagates the message to the first virtual node.

Figure 9:
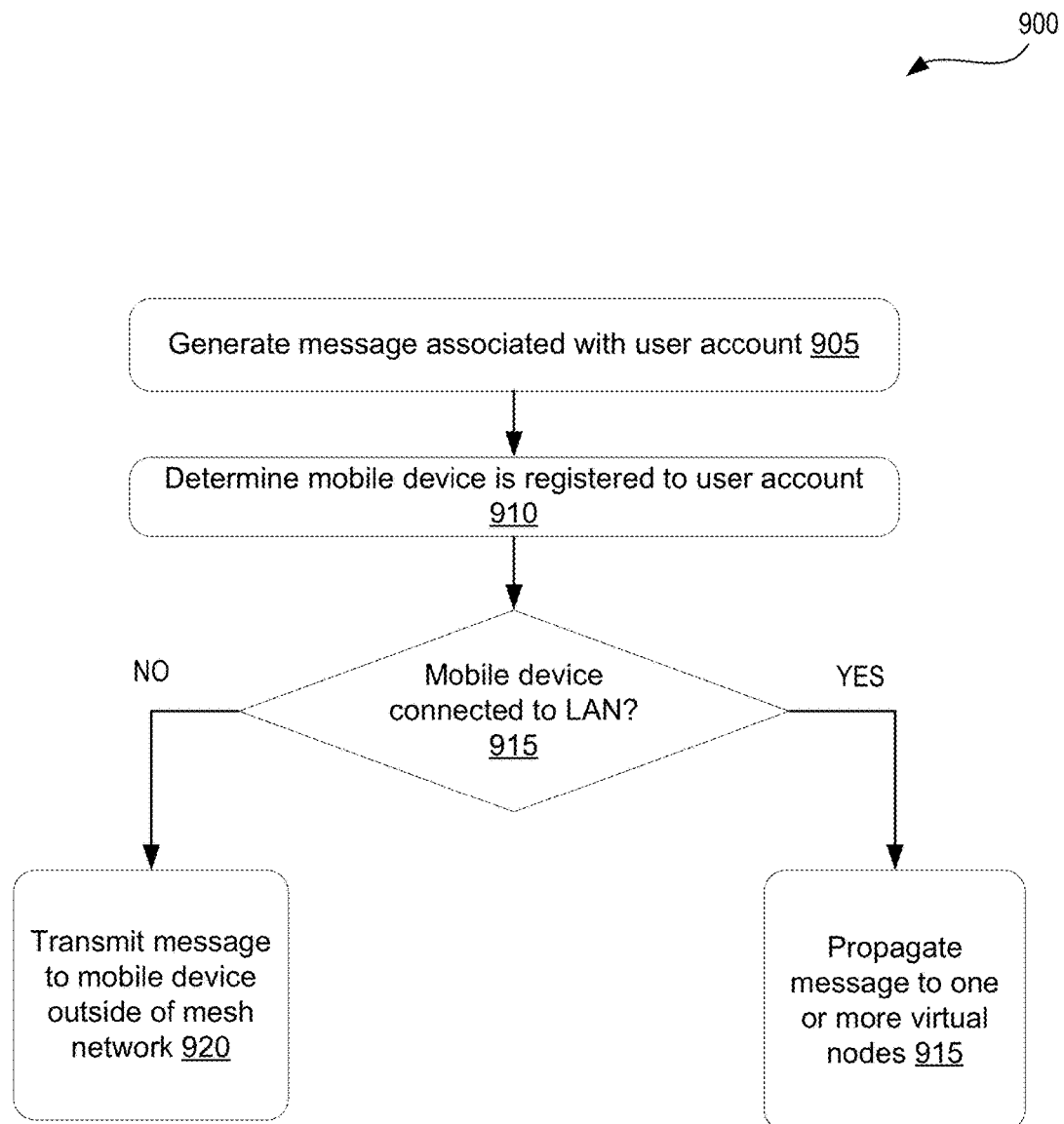
FIG. 9 is a flow diagram illustrating an embodiment for a method of propagating messages by a virtual hub of a virtual mesh network to a mobile device.

FIG. 9 is a flow diagram illustrating an embodiment for a method 900 of propagating messages by a virtual hub of a virtual mesh network to a mobile device. At block 905 of method 900, processing logic generates a message associated with a user account. At block 910, processing logic determines that a mobile device is associated with the user account, wherein the mobile device is additionally associated with a first virtual node of a virtual mesh network.

At block 915, processing logic branches based on whether the mobile device is connected to a local area network (LAN) associated with the user account. If processing logic detects that the mobile device is connected to the LAN, processing proceeds to block 915. At block 915, processing logic propagates the message to one or more virtual nodes. For example, processing logic may propagate the message to the first virtual node associated with the mobile device, wherein the first virtual node is to send the message to the mobile device via the virtual mesh network. Alternatively, or additionally, processing logic may propagate the message to the virtual nodes associated with some or all of the medical voice command devices included in the virtual mesh network. Each of these medical voice command devices may then output the message as an audio message. If processing logic detects that the mobile device is not connected to the LAN, processing proceeds to block 920. At block 920, processing logic transmits the message to the mobile device outside of the virtual mesh network. The message may be a reminder to take a medication, a reminder to attend an appointment, a notice of air quality, and so on.

Figure 10:
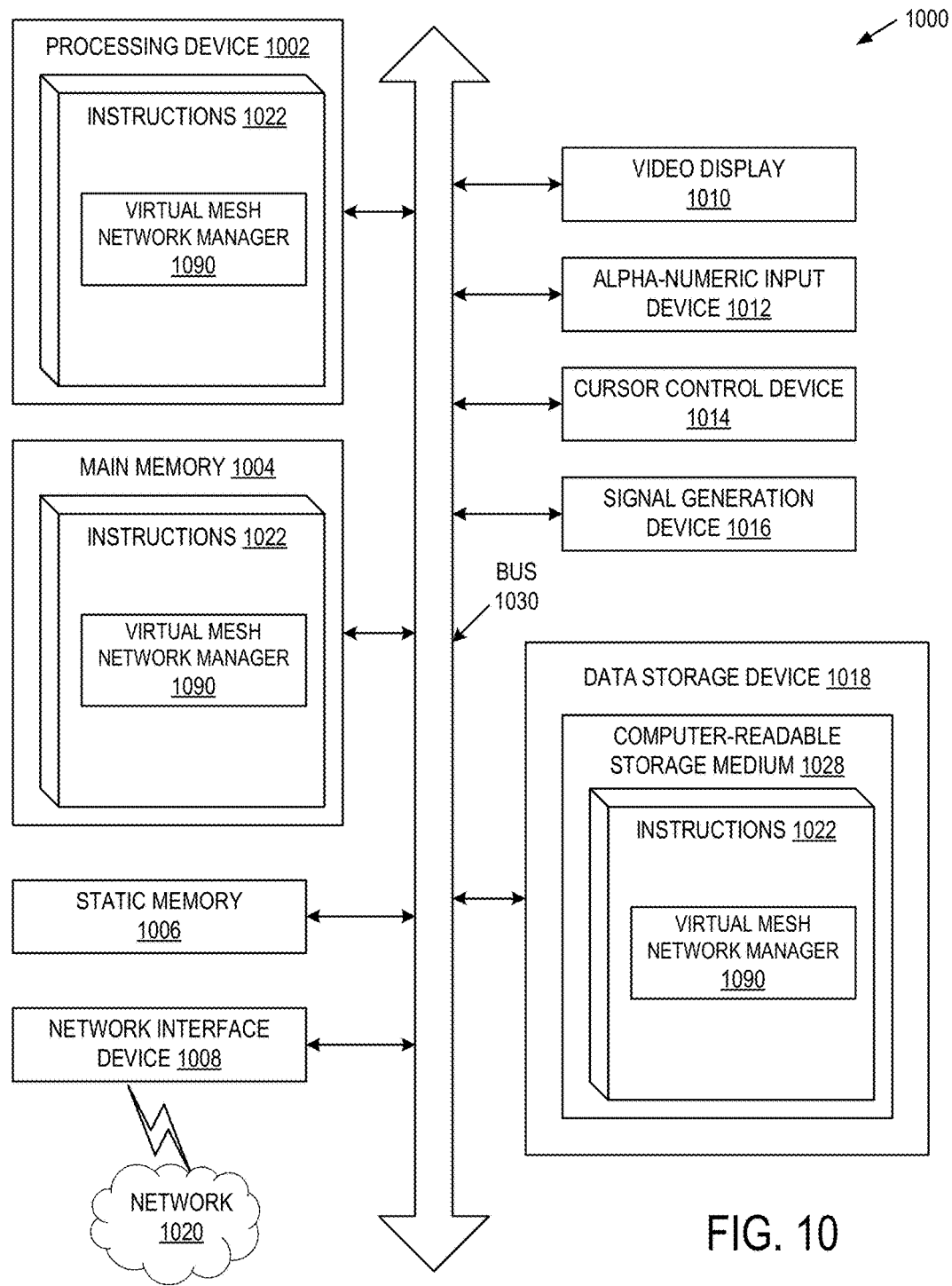
FIG. 10 illustrates an example computing device, in accordance with one embodiment.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory (e.g., a data storage device 1018), which communicate with each other via a bus 1030.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1022) for performing the operations and steps discussed herein.

The computing device 1000 may further include a network interface device 1008. The computing device 1000 also may include a video display 1010 (e.g., a liquid crystal display (LCD) or a cathode ray tube (CRT)), an alphanumeric input device 1012 (e.g., a keyboard), a cursor control device 1014 (e.g., a mouse), and/or a signal generation device 1016 (e.g., a speaker).

The data storage device 1018 may include a machine-readable storage medium (or more specifically a computer-readable storage medium) 1028 on which is stored one or more sets of instructions 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting computer-readable storage media.

The computer-readable storage medium 1028 may also be used to store virtual mesh network manager 1090 (as described with reference to the preceding figures), and/or a software library containing methods that call a virtual mesh network manager 1090. While the computer-readable storage medium 1028 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "non-transitory computer-readable storage medium" shall accordingly be taken to include, but not be limited to, solid-state memories, and optical and magnetic media.

The modules, components and other features described herein (for example in relation to FIG. 2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "sending", "propagating", "determining", "receiving", "identifying", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read only memories (EPROMs), electrically erasable programmable read only memories (EEPROMs), magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
adding, by a processing device, a plurality of voice command devices to a user account;
determining, by the processing device, that the plurality of voice command devices share a local area network (LAN);
generating, by the processing device, a virtual mesh network associated with the user account, the virtual mesh network comprising a virtual hub and a plurality of virtual nodes, wherein each virtual node of the plurality of virtual nodes is associated with a corresponding voice command device of the plurality of voice command devices;
generating, by the processing device, a message associated with the user account;
sending, by the processing device, the message to the virtual mesh network associated with the user account; and
propagating, by the processing device executing the virtual hub of the virtual mesh network, the message to at least one virtual node of the plurality of virtual nodes, wherein the at least one virtual node provides the message to the corresponding voice command device.

2. The method of claim 1, further comprising:
identifying each virtual node of the plurality of virtual nodes associated with the virtual mesh network for the user account; and
propagating the message to each virtual node of the plurality of virtual nodes, wherein each virtual node is to send the message to the corresponding voice command device for that virtual node, and wherein the plurality of voice command devices are to output the message via respective audio outputs of the plurality of voice command devices in parallel.

3. The method of claim 1, further comprising:
determining that the message is associated with a command received from a first voice command device, wherein the first voice command device is associated with a first virtual node; and
propagating the message to the first virtual node, wherein the first virtual node is to provide the message to the first voice command device.

4. The method of claim 3, further comprising:
receiving the command from the first voice command device and from a second voice command device, wherein the second voice command device is associated with a second virtual node;
determining a first signal strength for the command received from the first voice command device and a second signal strength for the command received from the second voice command device;
determining that the first signal strength is greater than the second signal strength; and
pairing the command with the first virtual node associated with the first voice command device.

5. The method of claim 4, wherein the command comprises a voice command, wherein the first signal strength comprises a first volume of the voice command, and wherein the second signal strength comprises a second volume of the voice command.

6. The method of claim 1, further comprising:
receiving a first audio signal from a first voice command device and a second audio signal from a second voice command device, wherein the first voice command device is associated with a first virtual node, and wherein the second voice command device is associated with a second virtual node;
determining a first signal strength for the first audio signal received from the first voice command device and a second signal strength for the second audio signal received from the second voice command device;
determining that the first signal strength is less than the second signal strength;
sending a notification to the first virtual node to ignore subsequent voice commands from the first voice command device;
pairing the second virtual node with messages associated with voice commands received from the second voice command device; and
propagating the message to the second virtual node, wherein the second virtual node is to provide the message to the second voice command device.

7. The method of claim 1, further comprising:
receiving, from a first voice command device, an indication of a first signal strength for a signal between a first medical device and the first voice command device, wherein the first voice command device is associated with a first virtual node;
receiving, from a second voice command device, an indication of a second signal strength for a signal between the first medical device and the second voice command device, wherein the second voice command device is associated with a second virtual node;
determining that the first signal strength is greater than the second signal strength;
sending a notification to the second virtual node that causes at least one of the second virtual node or the second voice command device to ignore messages from the first medical device; and
determining that the first virtual node is to manage messages associated with the first medical device.

8. The method of claim 7, wherein the first signal strength comprises a transmission signal intensity from the medical device to the first voice command device, and the second signal strength comprises a transmission signal intensity from the medical device to the second voice command device.

9. The method of claim 7, further comprising:
determining that the message is associated with medical data received from the first medical device;
wherein the virtual node to which the message is propagated is the first virtual node, and wherein the first virtual node is to provide the message to the first voice command device.

10. The method of claim 1, further comprising:
determining that a mobile device is registered with the user account, wherein the mobile device is associated with a first virtual node of the virtual mesh network;
detecting that the mobile device is connected to the LAN; and
propagating the message to the first virtual node, wherein the first virtual node is to send the message to the mobile device via the virtual mesh network.

11. The method of claim 1, further comprising:
determining that a mobile device is registered with the user account, wherein the mobile device is associated with a first virtual node;
detecting that the mobile device is not connected to the LAN; and
transmitting the message to the mobile device outside of the virtual mesh network.

12. The method of claim 1, further comprising:
wherein each virtual node is associated with a single voice demand device of the plurality of voice command devices.

13. A server computing system comprising:
a memory; and
a processing device operatively coupled to the memory, the processing device to:
add, by the processing device, a plurality of voice command devices to a user account;
determine, by the processing device, that the plurality of voice command devices share a local area network (LAN);
generate, by the processing device, a virtual mesh network associated with the user account, the virtual mesh network comprising a virtual hub and a plurality of virtual nodes, wherein each virtual node of the plurality of virtual nodes is associated with a corresponding voice command device of the plurality of voice command devices;
generate, by the processing device, a message associated with the user account;
send, by the processing device, the message to the virtual mesh network associated with the user account; and
propagate, by the processing device executing the virtual hub of the virtual mesh network, the message to at least one virtual node of the plurality of virtual nodes, wherein the at least one virtual node provides the message to the corresponding voice command device.

14. The server computing system of claim 13, wherein the processing device is further to:
receive a command from a first voice command device and from a second voice command device, wherein the first voice command device is associated with a first virtual node, and wherein the second voice command device is associated with a second virtual node;
determine a first signal strength for the command received from the first voice command device and a second signal strength for the command received from the second voice command device;
determine that the first signal strength is greater than the second signal strength;
pair the command with the first virtual node associated with the first voice command device; and
propagate the message to the first virtual node, wherein the first virtual node is to provide the message to the first voice command device.

15. The server computing system of claim 13, wherein the processing device is further to:
receive a first audio signal from a first voice command device and a second audio signal from a second voice command device, wherein the first voice command device is associated with a first virtual node, and wherein the second voice command device is associated with a second virtual node;
determine a first signal strength for the first audio signal received from the first voice command device and a second signal strength for the second audio signal received from the second voice command device;
determine that the first signal strength is less than the second signal strength;
send a notification to the first virtual node to ignore subsequent voice commands from the first voice command device;
pair the second virtual node with messages associated with voice commands received from the second voice command device; and
propagate the message to the second virtual node, wherein the second virtual node is to provide the message to the second voice command device.

16. The server computing system of claim 13, wherein the processing device is further to:
receive, from a first voice command device, an indication of a first signal strength for a signal between a first medical device and the first voice command device, wherein the first voice command device is associated with a first virtual node;
receive, from a second voice command device, an indication of a second signal strength for a signal between the first medical device and the second voice command device, wherein the second voice command device is associated with a second virtual node;
determine that the first signal strength is greater than the second signal strength;
send a notification to the second virtual node that causes at least one of the second virtual node or the second voice command device to ignore messages from the first medical device; and
determine that the first virtual node is to manage messages associated with the first medical device.

17. The server computing system of claim 13, wherein the processing device is further to:
determine that a mobile device is registered with the user account, wherein the mobile device is associated with a first virtual node of the virtual mesh network;
responsive to detecting that the mobile device is connected to the LAN, propagate the message to the first virtual node, wherein the first virtual node is to send the message to the mobile device via the virtual mesh network; and
responsive to detecting that the mobile device is not connected to the LAN, transmit the message to the mobile device outside of the virtual mesh network.

18. A non-transitory computer readable storage medium having instructions that, when executed by a processing device, cause the processing device to perform operations comprising:
adding, by the processing device, a plurality of voice command devices to a user account;
determining, by the processing device, that the plurality of voice command devices share a local area network (LAN);
generating by the processing device, a virtual mesh network associated with the user account, the virtual mesh network comprising a virtual hub and a plurality of virtual nodes, wherein each virtual node of the plurality of virtual nodes is associated with a corresponding voice command device of the plurality of voice command devices;
generating, by the processing device, a message associated with a user account;
sending, by the processing device, the message to the virtual mesh network associated with the user account; and
propagating, by the processing device executing the virtual hub of the virtual mesh network, the message to at least one virtual node of the plurality of virtual nodes, wherein the at least one virtual node provides the message to the corresponding voice command device.

19. The non-transitory computer readable storage medium of claim 18, the operations further comprising:

receiving a first audio signal from a first voice command device and a second audio signal from a second voice command device, wherein the first voice command device is associated with a first virtual node, and wherein the second voice command device is associated with a second virtual node;

determining a first signal strength for the first audio signal received from the first voice command device and a second signal strength for the second audio signal received from the second voice command device;

determining that the first signal strength is less than the second signal strength;

sending a notification to the first virtual node to ignore subsequent voice commands from the first voice command device;

pairing the second virtual node with messages associated with voice commands received from the second voice command device; and propagating the message to the second virtual node, wherein the second virtual node is to provide the message to the second voice command device.

20. The non-transitory computer readable storage medium of claim 18, the operations further comprising:

receiving, from a first voice command device, an indication of a first signal strength for a signal between a first medical device and the first voice command device, wherein the first voice command device is associated with a first virtual node;

receiving, from a second voice command device, an indication of a second signal strength for a signal between the first medical device and the second voice command device, wherein the second voice command device is associated with a second virtual node;

determining that the first signal strength is greater than the second signal strength;

sending a notification to the second virtual node that causes at least one of the second virtual node or the second voice command device to ignore messages from the first medical device; and determining that the first virtual node is to manage messages associated with the first medical device.

* * * * *